United States Patent
Venkatesan et al.

(10) Patent No.: US 12,513,637 B2
(45) Date of Patent: Dec. 30, 2025

(54) METHODS AND ARRANGEMENTS FOR REVERSE SYNCHRONIZATION ON A WIRELESS MEDIUM

(71) Applicant: Intel Corporation, Santa Clara, CA (US)

(72) Inventors: Ganesh Venkatesan, Hillsboro, OR (US); Elad Oren, Tel Aviv (IL); Susruth Sudhakaran, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 17/561,854

(22) Filed: Dec. 24, 2021

(65) Prior Publication Data

US 2022/0124656 A1 Apr. 21, 2022

(51) Int. Cl.
*H04W 56/00* (2009.01)
*H04L 7/00* (2006.01)

(52) U.S. Cl.
CPC ....... *H04W 56/0035* (2013.01); *H04L 7/0012* (2013.01); *H04L 7/0016* (2013.01); *H04W 56/003* (2013.01)

(58) Field of Classification Search
CPC .... H04J 3/0667; H04L 7/0012; H04L 7/0016; H04W 56/001; H04W 56/003; H04W 56/0035
See application file for complete search history.

(56) References Cited

U.S. PATENT DOCUMENTS

| 11,405,881 | B1* | 8/2022 | Harris | H04W 56/003 |
| 2023/0164710 | A1* | 5/2023 | Smith | H04W 56/004 370/350 |
| 2023/0195161 | A1* | 6/2023 | Shiga | H04J 3/0667 713/400 |

OTHER PUBLICATIONS

Tenea, Bogdan; Percival, Eric; Regev, Alon., 802.1AS Recovered Clock Quality Testing—AVNU—Revision 1.0—Oct. 18, 2016, 16 pages.
IEEE Standards Association—IEEE Standard for Local and Metropolitan Area Networks—Timing and Synchronization for Time Sensitive Applications—IEEE Computer Society—retrieved Dec. 22, 2021, 421 pages.

* cited by examiner

*Primary Examiner* — Donald L Mills
(74) *Attorney, Agent, or Firm* — KDW FIRM PLLC

(57) ABSTRACT

Logic to receive a first set of two or more timing management frames wherein one or more of the two or more timing management frames in the first set comprise a first adjusted follower clock value. Logic to calculate a second adjusted clock value. Logic to cause transmission of a second set of two or more timing management frames, wherein one or more of the two or more timing management frames in the second set comprise the second adjusted clock value. Logic to cause transmission of a first set of two or more acknowledgement frames. Logic to receive a second set of two or more acknowledgement frames. And logic to calculate a difference between the first adjusted follower clock value and the second adjusted clock value to determine a synchronization error, the synchronization error to represent a performance of the time synchronization.

25 Claims, 16 Drawing Sheets

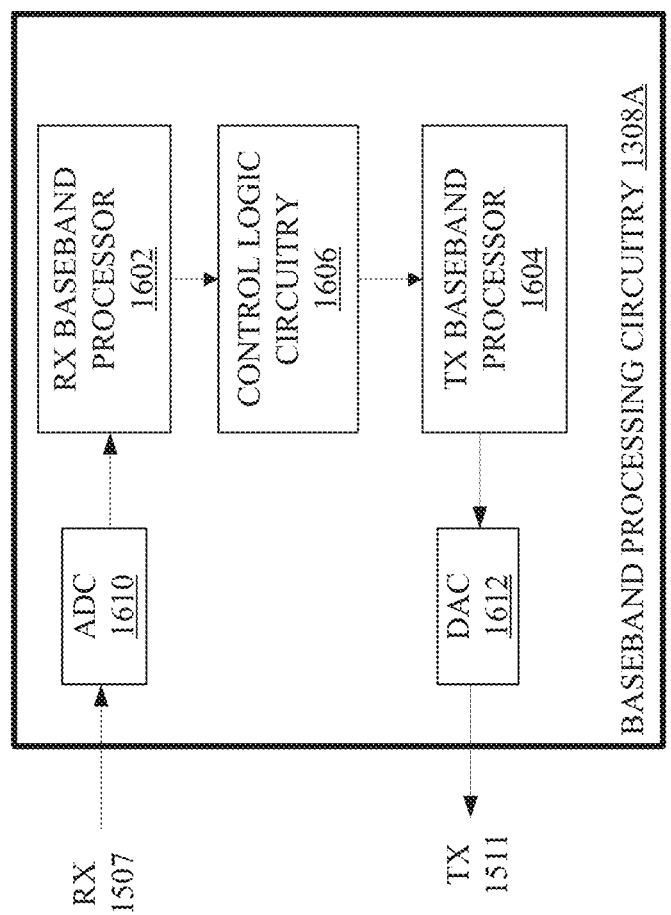

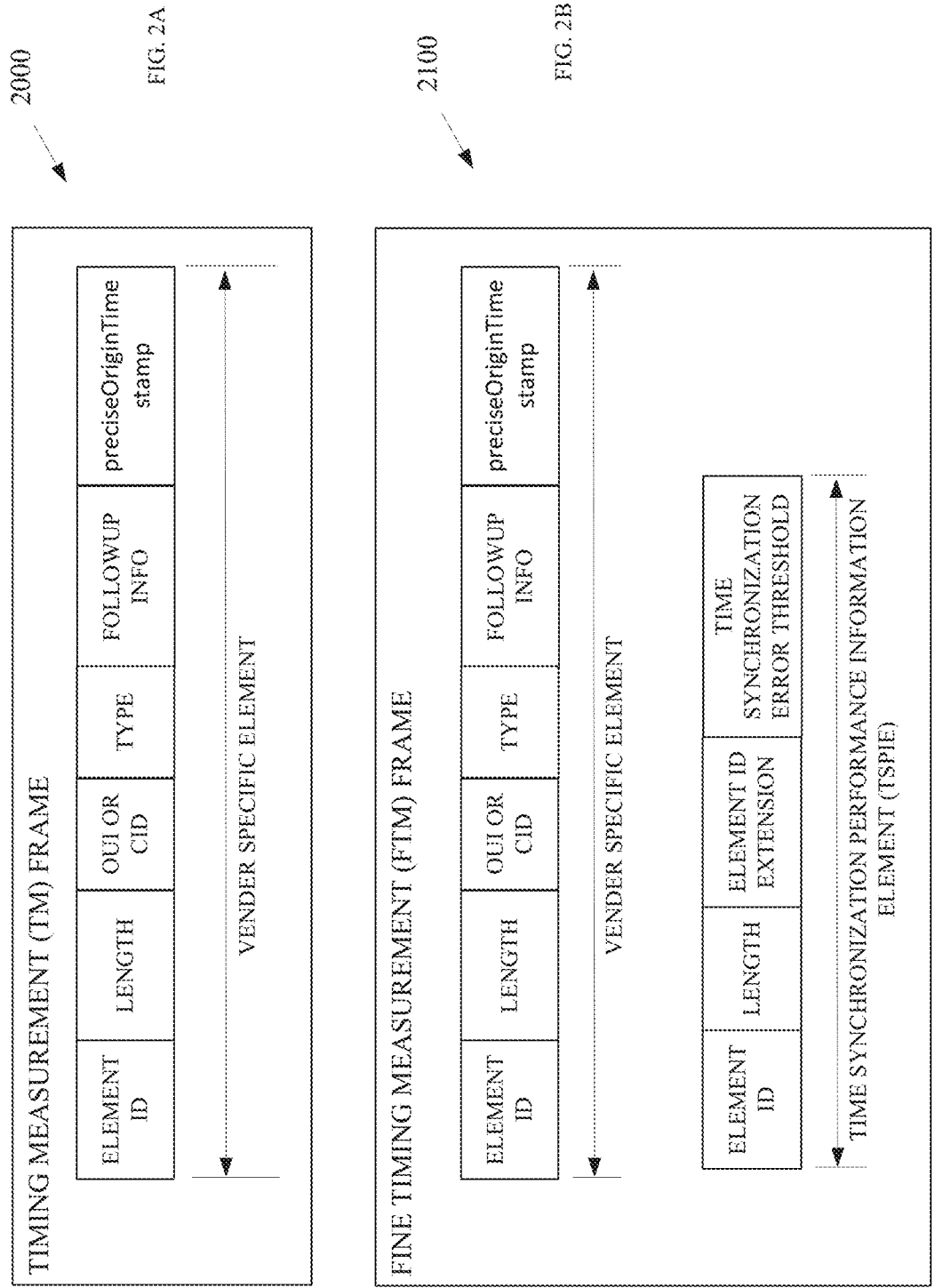

METHODS AND ARRANGEMENTS FOR REVERSE SYNCHRONIZATION ON A WIRELESS MEDIUM

TECHNICAL FIELD

This disclosure generally relates to systems and methods for wireless communications and, more particularly, involve establishment of reverse synchronization on a wireless medium.

BACKGROUND

Synchronizing time across the components in a network is necessary for a variety of distributed, time-sensitive applications executing at different nodes in the network. For synchronized time to be useful to time-sensitive applications, the synchronized time should meet critical performance requirements. Thus, networks offering time synchronization for time-sensitive applications requires the network to monitor the time synchronization performance to ensure the synchronized time is accurate enough for a time-sensitive application's performance.

For wireless media, performance of time synchronization across the components in a wireless network is more susceptible to channel conditions. So, monitoring the performance of time synchronization over the wireless medium is critical.

BRIEF DESCRIPTION OF THE DRAWINGS

FIG. 1G illustrates an embodiment of baseband processing circuitry of a wireless interface for STAs, such as the STAs in FIGS. 1A-C, to implement synchronization logic circuitry.

FIG. 2A depicts an embodiment of timing management frame.

FIG. 2B depicts an embodiment of a fine timing management frame.

DETAILED DESCRIPTION OF EMBODIMENTS

Figure 1A:
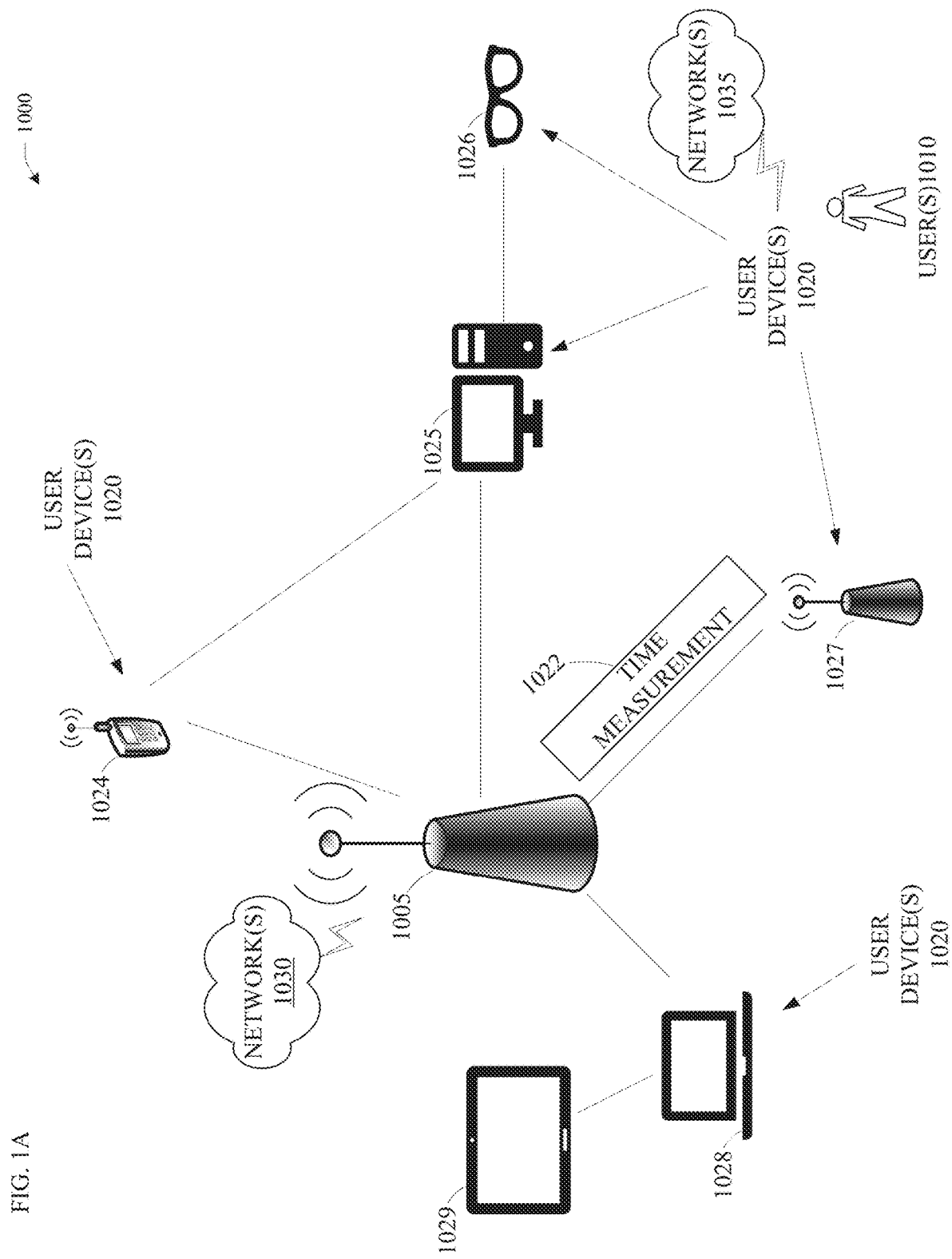
FIG. 1A depicts a system diagram illustrating an embodiment of a network environment for synchronization logic circuitry, in accordance with one or more example embodiments.
Figure 1B:
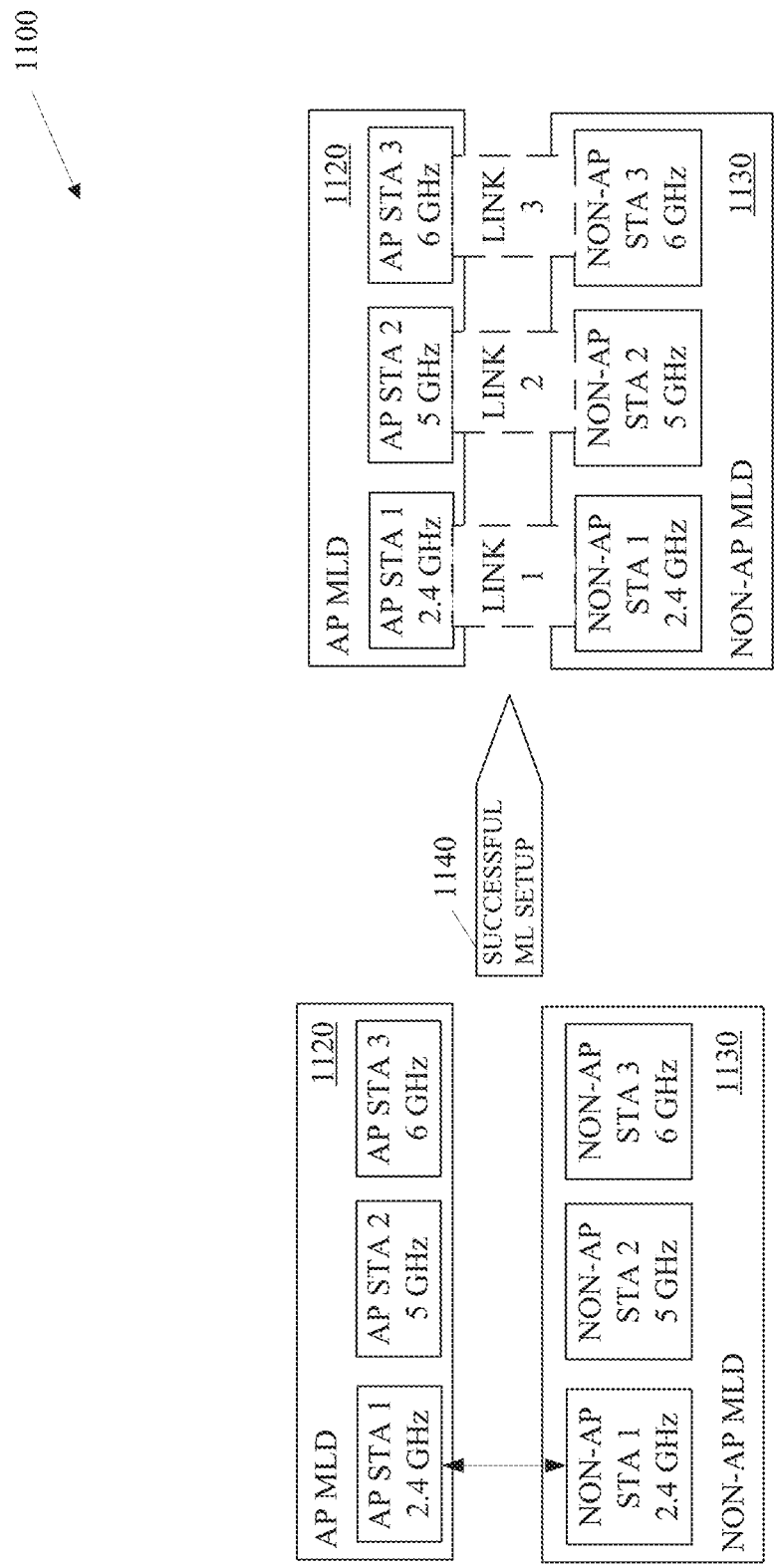
FIG. 1B depicts an embodiment illustrating interactions between stations (STAs) to establish multiple links between an access point (AP) multi-link device (MLD) and a non-AP MLD.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may comprise synchronization logic circuitry to implement time synchronization between a leader and a follower. The leader is a device that is selected to maintain the time and followers adjust their times to match the time of the leader. The following embodiments focus primarily on the interactions between one follower and the leader but note that, in many embodiments, each leader may have multiple followers.

Embodiments may determine performance information related to how closely a follower is time synched with a leader. For instance, the follower may perform time-sensitive actions that may be coordinated with the time-sensitive actions of one or more followers, other devices, events, and/or the like. Maintaining time synchronization of the followers within a maximum synchronization error is critical to the success of the applications executing on the follower.

In many embodiments, the leader and the followers may comprise Wi-Fi stations (STAs) that operate in accordance with one or more Institute of Electrical and Electronics Engineers (IEEE) 802.11 standards such as IEEE 802.11-2020, December 2020. In such embodiments, the leader and the followers may also operate in accordance with a time-synchronization standard such as IEEE 802.1AS-2020.

In some embodiments, time synchronization is initiated as defined in IEEE 802.1AS-2020 Clause-12 using either the Timing Measurement (TM) protocol or the Fine Timing Measurement (FTM) protocol. The FTM protocol may offer a more accurate tuning of the times between the leader and the follower such as timestamps within 10 nanoseconds With the execution of the TM or FTM protocol, the follower determines the relative offset of its local clock with respect to the clock at the leader. The estimated offset may oscillate for a while as the protocol proceeds. The oscillation may damp down around a value at which time the follower may determine that it has reached a stable state.

The definition of 'stable state' is dependent on the set of applications that require time synchronization and their requirements for time synchronization performance. In general, the time synchronization reaches the 'stable state' prior to the initiation of the applications that require time synchronization and any perturbation from the 'stable state' is actively monitored by the implementation using the reverse sync and appropriate corrective actions are triggered to limit the perturbation(s) within an acceptable range.

Once the stable state is reached, many embodiments may initiate a reverse sync. If the TM protocol is implemented, the follower starts by sending TM frames to the leader including a preciseOriginTimestamp field set to the adjusted follower clock (local clock at the follower+ the relative offset of the local clock relative to that of the leader).

If the FTM protocol is implemented, the follower may send a FTM frame with a trigger field set to a value indicating that the stable state has been achieved at the follower. The Leader waits for the Follower to send an initial Fine Timing Measurement Request frame to start the next FTM session The Leader in response sends an initial Fine Timing Measurement Request frame to the Follower; and then responds to the received initial Fine Timing Measurement Request from the Follower with an initial Fine Timing Measurement frame.

At the end of this exchange a FTM session for the Forward Sync is established; and FTM session for the Reverse Sync is established. Fine Timing Measurement frames from the Follower to the Leader may include a frame where a preciseOriginTimestamp field is set to the adjusted follower clock (local clock at the follower+ the relative offset of the local clock relative to that of the leader).

If at the Follower, the estimated offset starts oscillating beyond the thresholds established for the stable state, the Reverse Sync operation is aborted; and will have to resume after the stable state is achieved. If the underlying 802.11 protocol is Timing Measurement protocol, the Follower simply stops sending Timing Measurement frames to the Leader. If the underlying 802.11 protocol is the Fine Timing Measurement protocol, the Follower sends Fine Timing Measurement frame with just the Trigger field set to a value indicating that the Follower is not in the stable state anymore. The Leader in response will stop initialing Fine Timing Measurement session negotiations for Reverse Sync.

Note that the Reverse Sync frames do not have to be transmitted during every TM session or FTM session. In many embodiments, some TM or FTM sessions may only include Forward Sync time synchronization. For instance, if the time synchronization error is low and has remained low for a predetermined time interval, some of the TM or FTM sessions may not include Reverse Synchronization. In other embodiments, the reverse synchronization may occur each TM or FTM session. In some embodiments, the number of TM frames or FTM frames transmitted during a TM session or FTM session, respectively, may not be equal. For instance, the number of forward sync TM or FTM frames may be greater than the number of TM or FTM frames transmitted during the TM or FTM session.

In still other embodiments, the fine timing measurement protocol is used for Forward Sync and the timing measurement protocol is used for Reverse Sync is possible. However, using the same protocol for both the Forward Sync and the Reverse Sync may be advantageous in relation to the nature of TM frame exchange being more regular versus the nature of FTM frames that may require an initial FTM frame to initiate the FTM frame exchanges for Forward Sync or Reverse Sync.

In some embodiments, the Reverse Sync may also be used as a mechanism to trigger changing the parameters used for Forward Sync. For instance, if the estimated time synchronization error is far below what is required for the supported time-sensitive applications, the parameters may be tweaked to render the corresponding [Fine] Timing Measurement frame exchanges less frequent.

In some embodiments, links (or logical) communications channels may be established between multi-link devices (MLDs). MLDs include more than one stations (STAs). For instance, an access point (AP) MLD and a non-AP MLD may include STAs configured for frequency bands such as a first STA configured for 2.4 GHz communications, a second STA configured for 5 GHz communications, and a third STA configured for 6 GHz communications.

Note that STAs may be AP STAs or non-AP STAs and may each be associated with a specific link of an MLD. Note also that a MLD can include AP functionality for one or more links and, if a STA of the MLD operates as an AP in a link, the STA is referred to as an AP STA. If the STA does not perform AP functionality, or does not operate as an AP, on a link, the STA is referred to as a non-AP STA. In many of the embodiments herein, the AP MLDs operate as APs on active links, and the non-AP MLDs operate as non-AP STAs on active links. However, an AP MLD may also have STAs that operate as non-AP STAs on the same extended service set (ESS) or basic service set (BSS) or other ESS's or BSS's.

For maintaining a quality of service (QoS), many embodiments define two or more access categories. Access categories may be associated with traffic to define priorities (in the form of parameter sets) for access to a channel for transmissions (or communications traffic) such as managed link transmissions. Many embodiments implement an enhanced distributed channel access (EDCA) protocol to establish the priorities. In some embodiments, the EDCA protocol includes access categories such as best efforts (AC_BE), background (AC_BK), video (AC_VI), and voice (AC_VO). Protocols for various standards provide default values for parameter sets for each of the access categories and the values may vary depending upon the type of a STA, the operational role of the STA, and/or the like.

Embodiments may also comprise synchronization logic circuitry to facilitate communications by stations (STAs) in accordance with different versions of Institute of Electrical and Electronics Engineers (IEEE) 802.11 standards for wireless communications such as IEEE 802.11-2020, December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with time synchronization such as support for time-sensitive applications; addressing time synchronization in a wireless medium; monitor the time synchronization performance to ensure the synchronized time is good enough in order to achieve the corresponding application performance; monitoring the performance time synchronization over the wireless medium; monitoring the performance time synchronization over the wireless medium without significant cost impact for specialized hardware; and/or the like.

Different technical problems such as those discussed above may be addressed by one or more different embodiments. Embodiments may address one or more of these problems associated with time synchronization over a wireless medium. For instance, some embodiments that address problems associated with time synchronization over a wireless medium may do so by one or more different technical means, such as, receiving a first set of two or more timing management frames wherein one or more of the two or more timing management frames in the first set comprise a first adjusted follower clock value; causing transmission of a second set of two or more timing management frames, wherein one or more of the two or more timing management frames in the second set comprise a second adjusted clock value; transmitting a first set of two or more acknowledgement frames; receiving a second set of two or more acknowledgement frames; calculating the second adjusted clock value; calculating a difference between the first adjusted follower clock value and the second adjusted clock value to determine a synchronization error, the synchronization error to represent a performance of the time synchronization; causing transmission of a first set of two or more timing management frames wherein one or more of the two or more timing management frames in the first set comprise a first adjusted leader clock value; receiving a second set of two or more timing management frames, wherein one or more of the two or more timing management frames in the second set comprise a second adjusted clock value; receiving a first set of two or more acknowledgement frames; calculating the second adjusted clock value; causing transmission of a second set of two or more acknowledgement frames; calculating a difference between the first adjusted leader clock value and the second adjusted clock value to determine a synchronization error, the synchronization error to represent a performance of the time synchronization; and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards. Some embodiments may comprise low power wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for synchronization logic circuitry, in accordance with one or more example embodiments. Wireless network 1000 may include one or more user devices 1020 and one or more access points(s) (AP) 1005, which may communicate in accordance with IEEE 802.11 communication standards. The user device(s) 1020 may comprise mobile devices that are non-stationary (e.g., not having fixed locations) and/or stationary devices.

Figure 3:
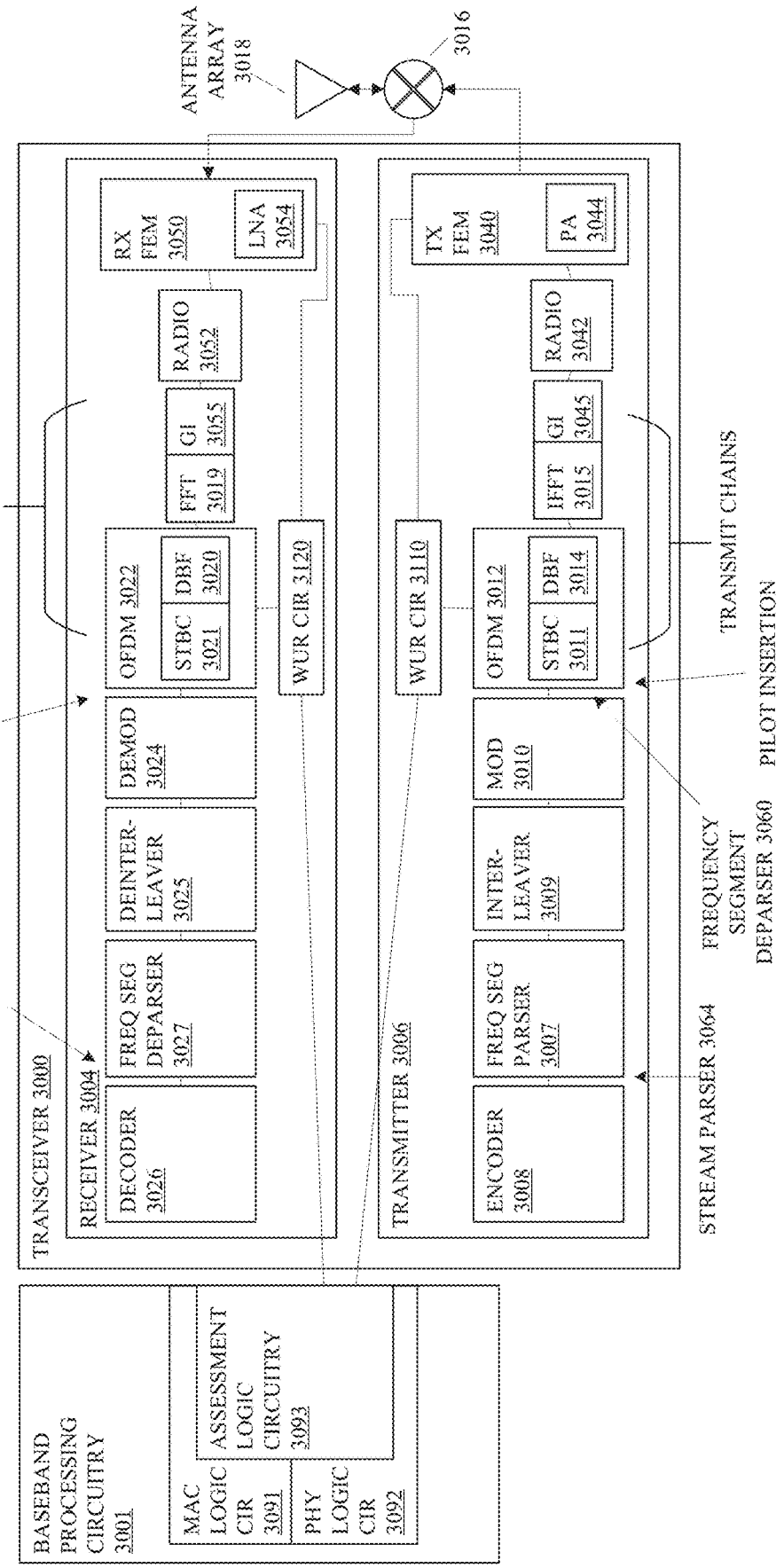
FIG. 3 depicts an embodiment of service period access with synchronization logic circuitry.

In some embodiments, the user device(s) 1020 and the AP(s) 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as an extended service set (ESS), a basic service set (BSS), a personal basic service set (PBSS), or a control point/access point (PCP/AP). The user device(s) 1020 (e.g., 1024, 1025, 1026, 1027, 1028, or 1029) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1025, 1026, 1027, 1028, and 1029) and AP(s) 1005 may be configured to communicate with each other via one or more communications networks 1030 and/or 1035 wirelessly or wired. In some embodiments, the user device(s) 1020 may also communicate peer-to-peer or directly with each other with or without the AP(s) 1005 and, in some embodiments, the user device(s) 1020 may also communicate peer-to-peer if enabled by the AP(s) 1005.

Furthermore, the AP(s) 1005 may comprise more than one AP MLDs each comprising synchronization logic circuitry to implement time synchronization. For instance, some applications may require one or more STAs maintain closely synchronized clocks for coordination between multiple devices, STAs, and the like. Such applications are often referred to as time-sensitive applications and may have specifications related to performance such as the maintenance of a synchronization error below some maximum synchronization error such as 20 nanoseconds. While time-sensitive applications have historically operated on proprietary systems and have recently implement some hardwired, standardized network components, wireless embodiments such as AP(s) 1005 and user device 1020 with synchronization logic circuitry may offer advantages of not only the time synchronization performance and monitoring but also wireless communications between the STAs, devices, and the like, operating in a time-sensitive network (TSN).

In the present embodiment, the AP(s) 1005 may be selected to be a leader in relation to maintaining an accurate clock and one or more of the user devices 1022 may be followers such as the user device 1027. The user device 1027 may execute one or more time-sensitive applications that have specific performance requirements for time synchronization between the user device 1027 and the AP(s) 1005.

The synchronization logic circuitry of the user device 1027 may periodically initiate timing management (TM) sessions that involve determining a synchronization error to quantify a performance of the time synchronization between the AP(s) 1005 and the user device 1027. In many embodiments, the TM sessions may involve interlacing burst of forward sync TM frame and reverse sync TM frames. For instance, the follower may start the TM session by transmitting a TM frame (R1) for reverse sync at time tri and capturing the time t1. The AP(s) 1005 may receive the TM frame (R1) for reverse sync a time tR2. Thereafter, at time tri, the leader may transmit a TM frame (F1) for forward sync and an acknowledgement (ACK) (R1) at time tR3 in response to the TM frame (R1). The ACK (R1) may include the time of arrival of the TM frame (R1) at the AP(s) 1005, time tR2, as well as the time of departure of the ACK (R1), time tR3 to provide the follower, user device 1027, with information needed to calculate an offset between the AP(s) 1005 (leader) clock and the clock of the user device 1027 (follower).

The user device 1027 may receive the TM frame (F1) at time $t_F 2$, and may transmit a TM frame (R2) at time $t^1_R 1$. The TM frame (R2) may include a calculation of the offset between the AP(s) 1005 (leader) clock and the clock of the user device 1027 (follower) in a field of the TM frame (R2) and/or the TM frame (R2) may include a calculation of the local clock of the follower plus the offset between the AP(s) 1005 (leader) clock and the clock of the user device 1027 (follower) in a field of the TM frame (R2). Similarly, after receipt of an ACK (F1), the AP(s) 1005 may calculate the offset between the clock of the AP(s) 1005 and/or the sum of the offset and the local clock of the leader, AP(s) 1005.

The frame exchanges may continue to exchange, e.g., three or more TM frames for forward sync and, e.g., 3 or more TM frames for reverse sync, calculating the offsets between the clocks and/or the local clock times plus or minus the offsets to determine the estimated follower's clock and/or the estimated leader's clock. In some embodiments, the follower, user device 1027, may calculate the difference between a first adjusted time calculated by the leader, which is received via a TM frame, and a second adjusted time calculated by the follower to determine a synchronization error. In other words, the AP(s) 1005 can calculate the delay caused by transmission of the TM frames and ACKs as a clock offset at the receiving STA relative to the sending STA as equal to $[(t2-t1)-(t4-t3)]/2$. If the offsets differ, the difference is a synchronization error and the follower, user device 1027, may take mitigating measures to address the performance issues and/or accept the synchronization error as representative of the performance of the time synchronization via the synchronization logic circuitry of the follower and the leader.

In other embodiments, the forward sync and the reverse sync TM frame transmissions do not have to be interleaved. For instance, four forward sync TM frames may be transmitted and four ACKs received in response prior to transmitting the reverse sync frames and ACKs, or vice versa. In still other embodiments, the forward sync and the reverse sync TM frame transmissions may be interleaved differently. For instance, the synchronization logic circuitry may transmit a forward sync TM frame and receive an ACK prior to receipt of a reverse sync TM frame and transmission of an ACK in response.

Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1025, 1026, 1027, 1028, and 1029) and AP(s) 1005 may include one or more communications antennas. The one or more communications antennas may be any suitable type of antennas corresponding to the communications protocols used by the user device(s) 1020 (e.g., user devices 1024, 1025, 1026, 1027, 1028, and 1029) and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1025, 1026, 1027, 1028, and 1029) and AP(s) 1005 may be configured to wirelessly communicate in a wireless network. Any of the user device(s) 1020 (e.g., user devices 1024, 1025, 1026, 1027, 1028, and 1029) and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1025, 1026, 1027, 1028, and 1029) and AP(s) 1005 may be configured to perform any given directional transmission towards one or more defined transmit sectors. Any of the user device(s) 1020 (e.g., user devices 1024, 1025, 1026, 1027, 1028, and 1029) and AP(s) 1005 may be configured to perform any given directional reception from one or more defined receive sectors.

At element 4020, synchronization logic circuitry of leader may cause transmission of a second set of two or more timing management frames, wherein one or more of the two or more timing management frames in the second set comprise a second adjusted clock value. The second set of two or more timing management frames may comprise part of a forward sync. In some embodiments, the TM frames of the two set may be interleaved such as the TM frames shown in FIG. 2C. In other embodiments, the interleaving may be performed in a different pattern such as two forward sync TM frames for each reverse sync TM frame, or vice versa.

At element 4025, synchronization logic circuitry of leader may cause transmission of a first set of two or more acknowledgement frames. And at element 4030, synchronization logic circuitry of leader may receive a second set of two or more acknowledgement frames. Note that these frames may be interleaved with the first and second sets of TM frames based on the interleaving of the TM frames. It is understood that the above descriptions are for purposes of illustration and are not meant to be limiting.

At element 4015, synchronization logic circuitry of leader may calculate a second adjusted clock value. At element 4035, synchronization logic circuitry of leader may calculate a difference between the first adjusted follower clock value and the second adjusted clock value to determine a synchronization error, the synchronization error to represent a performance of the time synchronization. In some embodiments, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. In some embodiments, calculation of the difference comprises calculation in response to receipt of each acknowledgement in the second set of acknowledgement frames.

AP STA 1, affiliated with the AP MLD 1120, may send an association response frame to non-AP STA 1 affiliated with the non-AP MLD 1130 with a TA field of the association response frame is set to the MAC address of the AP STA 1 and an RA field of the association response frame set to the MAC address of the non-AP STA 1, to indicate successful multi-link setup 1140. The association response frame may include complete information of AP STA 1, AP STA 2, and AP STA 3 and an ML element that indicates the MLD MAC address of the AP MLD 1120. After successful ML setup between the non-AP MLD 1130 and the AP MLD 1120, three links are setup (LINK 1 between AP 1 and non-AP STA 1, LINK 2 between AP 2 and non-AP STA 2, and LINK 3 between AP STA 3 and non-AP STA 3).

In some embodiments, the non-AP MLD 1130 may associate with less than all the links available from the AP MLD 1120 for various reasons. For instance, in some embodiments, the non-AP MLD 1130 may only be capable of establishing two of the links. In some embodiments, the non-AP MLD 1130 may establish a link with a second AP MLD because the second AP MLD may have a better signal-to-noise ratio associated with one or more links and be associated with the same ESS. In some embodiments, the non-AP MLD 1130 may establish a link with a second AP MLD because the second AP MLD may be associated with a different ESS or a BSS that is not associated with the BSS of the AP MLD 1120.

During the association process, the AP MLD 1120 may establish communications protocols including identification of any parameters that differ from default parameters, preferential communications protocols, and/or negotiate communications protocols for the links.

Figure 1C:
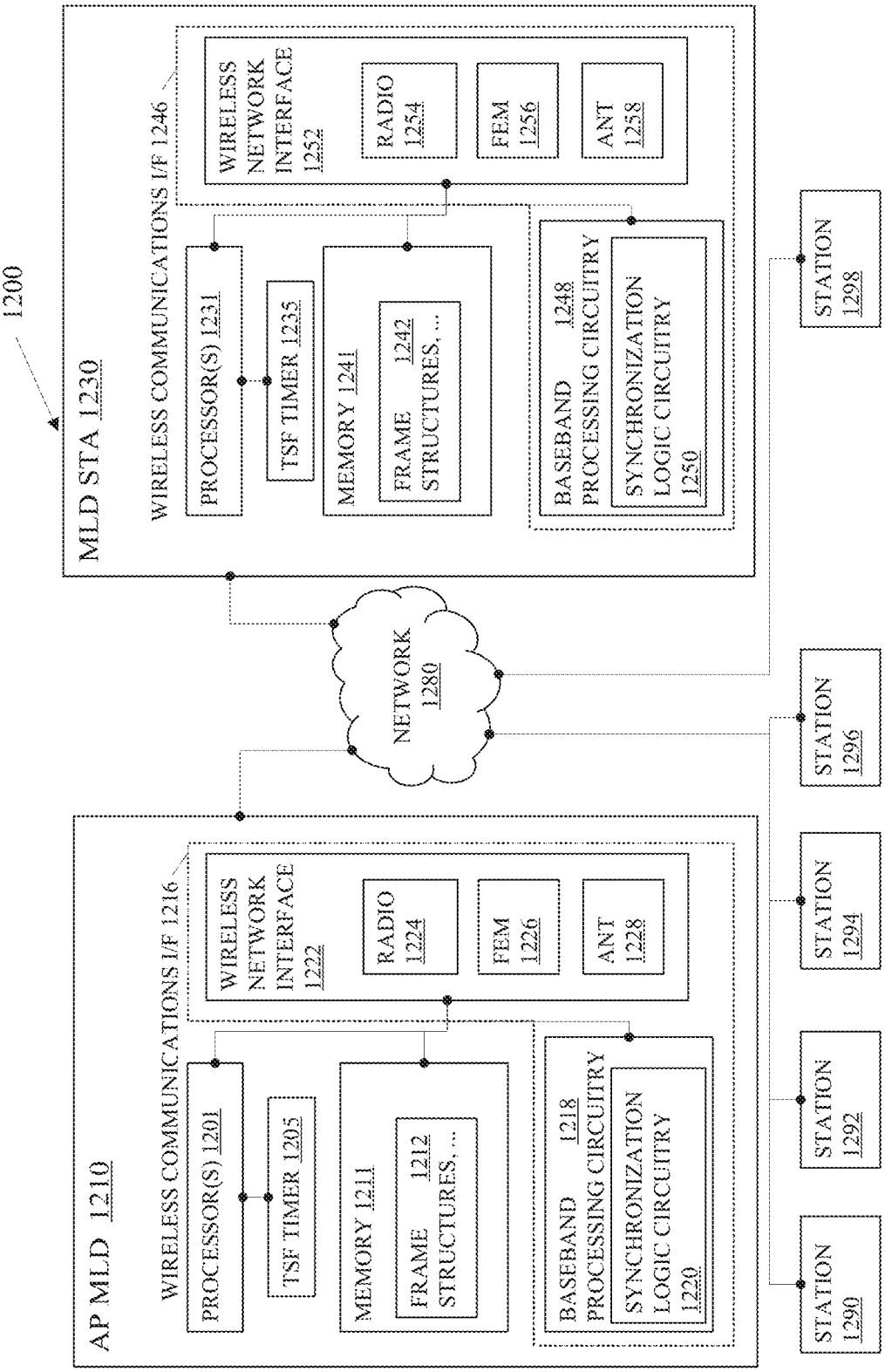
FIG. 1C depicts an embodiment of a system including multiple STAs to implement synchronization logic circuitry, in accordance with one or more example embodiments.

FIG. 1C depicts an embodiment of a system 1200 including multiple MLD STAs to implement synchronization logic circuitry, in accordance with one or more example embodiments. System 1200 may transmit or receive as well as generate, decode, and interpret transmissions between an AP MLD 1210 and multiple MLD STAs 1230, 1290, 1292, 1294, 1296, and 1298, associated with the AP MLD 1210. The AP MLD 1210 may be wired and wirelessly connected to each of the MLD STAs 1230, 1290, 1292, 1294, 1296, and 1298.

In some embodiments, the AP MLD 1210 and MLD STA 1230 may include one or more computer systems similar to that of the example machines/systems of FIGS. 5, 6, 7, and 8.

Each MLD STA 1230, 1290, 1292, 1294, 1296, and 1298 may include synchronization logic circuitry, such as the synchronization logic circuitry 1250 of MLD STA 1230, to associate with the AP MLD 1210 to synchronize the clock (TSF timer 1205) with the clocks (e.g., TSF timer 1235) of the MLD STAs 1230, 1290, 1292, 1294, 1296, and 1298. For example, the AP MLD 1210 may be selected as the leader and the MLD STAs 1230, 1290, 1292, 1294, 1296, and 1298 may be followers.

After associating with the AP MLD 1210, one or more of the MLD STAs 1230, 1290, 1292, 1294, 1296, and 1298 may initiate time synchronization with the AP MLD 1210. Time synchronization may involve a TM session or an FTM session. The TM session may include the transmission of TM frames from the follower (e.g., MLD STA 1230) to the leader (e.g., AP MLD 1210) as well as transmission of TM frames from the leader (e.g., AP MLD 1210) to the follower (e.g., MLD STA 1230). Transmission of TM frames from the follower to the leader is defined as reverse synchronization (reverse sync) and the transmission of TM frames from the leader to the follower is defined as forward synchronization (forward sync).

During forward sync, the synchronization logic circuitry 1220 of the AP MLD 1210 may transmit a set of two or more TM frames or FTM frames to the MLD STA 1230 and the synchronization logic circuitry 1250 of the MLD STA 1230 may respond with an ACK that carries the arrival time ($t_F2$) of the first TM frame and the transmission (or departure) time ($t_F3$) of the first ACK. When the AP MLD 1210 transmits the second TM frame, the AP MLD 1210 may include the transmission time ($t_F1$) of the first TM frame and the arrival time ($t_F4$) of the first ACK in the second TM frame. At the arrival of the second TM frame at the MLD STA 1230, the synchronization logic circuitry 1250 of the MLD STA 1230 may have $t_F1$, $t_F2$, $t_F3$, and $t_F4$ as well as the timestamp of the TM frame. The synchronization logic circuitry 1230 of the MLD STA 1230 may calculate the offset of the local clock relative to the clock of the AP MLD 1210 as $[(t_F2-t_F1)-(t_F4-t_F3)]/2$.

During reverse sync, the synchronization logic circuitry 1250 of the MLD STA 1230 may transmit a set of two or more TM frames or FTM frames to the AP MLD 1210 and the synchronization logic circuitry 1220 of the AP MLD 1210 may respond with an ACK that carries the arrival time ($t_R2$) of the first TM frame and the transmission (or departure) time ($t_R3$) of the first ACK. When the MLD STA 1230 transmits the second TM frame, the MLD STA 1213 may include the transmission time ($t_R1$) of the first TM frame and the arrival time ($t_R4$) of the first ACK in the second TM frame. At the arrival of the second TM frame at the AP MLD 1210, the synchronization logic circuitry 1220 of the AP MLD 1210 may have $t_R1$, $t_R2$, $t_R3$, and $t_R4$ as well as the timestamp of the TM frame. The synchronization logic circuitry 1220 of the AP MLD 1210 may calculate the offset of the local clock relative to the clock of the MLD STA 1230 as $[(t_R2-t_R1)-(t_R4-t_R3)]/2$.

Furthermore, the synchronization logic circuitry 1250 of the MLD STA 1230 may include in the second TM frame of the reverse sync, a preciseOriginTimestamp field set to the adjusted follower clock (local clock at the follower+ the relative offset of the local clock relative to that of the leader). The synchronization logic circuitry 1220 of the AP MLD STA 1210 may include in the second TM frame of the forward sync, a preciseOriginTimestamp field set to the adjusted leader clock (local clock at the leader+ the relative offset of the local clock relative to that of the follower).

The synchronization logic circuitry 1250 of the MLD STA 1230 may calculate a difference between the adjusted follower clock value and the adjusted leader clock value to determine a synchronization error, the synchronization error to represent a performance of the time synchronization. Monitoring of the synchronization error is important to guaranteeing a time synchronization for time sensitive applications. For instance, when the forward sync is executed, the follower computes a 'forward sync' offset which when added to the follower's clock should render the follower's clock to be synchronized to that of the leader. If there are no synchronization errors, the leader's clock and the follower's clock plus 'forward sync' offset should be exactly same (and the synchronization error therefore would be zero).

When executing the reverse sync, the follower sends the computed 'forward sync' offset to the leader. The leader computes a 'reverse sync' offset as a result of executing the reverse sync protocol with the follower. One might expect the error in synchronization to be the same in both directions (even with Wi-Fi multipath conditions as timestamps are derived from the transmission of 'FTM frames and the receipt of corresponding ACKs). The difference between the 'reverse sync' offset and the 'forward sync' offset may provide the lower bound of how best the two implementations can be synchronized.

In some embodiments, the MLD STAs 1230, 1290, 1292, 1294, 1296, and 1298 may individually negotiate time synchronization links and channels within the links that may be available for time synchronization. In further embodiments, the AP MLD 1210 may have a predetermined, default, or preferred set of links and channels that may be used for time synchronization. In some embodiments, parameters related to time synchronization may be negotiated by inclusion of parameters in an initial FTM frame that a follower may send to the AP MLD 1210 to initiate time synchronization. If the AP MLD 1210 accepts the parameters in the initial FTM frame from the follower, the AP MLD 1210 may proceed with an FTM session in response to the initial FTM frame. On the other hand, if the AP MLD 1210 does not accept the parameters in the initial FTM frame, the FTM session may end after transmission of the initial FTM frame from the follower.

In some embodiments, the synchronization logic circuitry 1220 of the AP MLD 1210 may negotiate a bandwidth of an FTM session with the synchronization logic circuitry 1250 of the MLD STA 1230. In some embodiments, the accuracy of time synchronization through forward sync and reverse sync may improve with wider bandwidths such as 20 MHz, 40 MHz, 80 MHz, 160 MHz, and/or the like. For instance, time synchronization on a 40 MHz bandwidth may be more accurate than time synchronization on a 20 MHz bandwidth.

The AP MLD 1210 and MLD STA 1230 may comprise processor(s) 1201 and memory 1231, respectively. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or PHY frames and PPDUs.

The baseband processing circuitry 1218 may comprise a baseband processor and/or one or more circuits to implement an MLD management entity and a station management entity per link. The MLD management entity may coordinate management of, communications between, and interactions between station management entities for the links.

In some embodiments, the station management entity may interact with a MAC layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a multiple-user (MU) ready to send (RTS), referred to as a MU-RTS, in a PHY frame such as an extremely high throughput (EHT) MU PPDU to the MLD STA 1230. The MAC layer functionality may generate frames such as management, data, and control frames.

The PHY may prepare the MAC frame for transmission by, e.g., determining a preamble to prepend to a MAC frame to create a PHY frame. The preamble may include one or more short training field (STF) values, long training field (LTF) values, and signal (SIG) field values. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value to indicate the time at which the PPDU is transmitted.

After processing the PHY frame, a radio 1224 may impress digital data onto subcarriers of RF frequencies for transmission. The front end module may include one or more stages of filtering and one or more stages of amplification including at least one power amplifier (PA) to prepare the subcarriers of RF frequencies for transmission by electromagnetic radiation via elements of an antenna array or antennas 1224 and via the network 1280 to a receiving MLD STA such as the MLD STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The MLD STA 1230 may receive the MU-RTS in the EHT MU PPDU from the AP MLD 1210 via the network 1280. The MLD STA 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PPDUs).

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The MLD STA 1230 may receive the EHT MU PPDU at the antennas 1258, which pass the signals along to the FEM 1256. The FEM 1256 may comprise one or more stages of filtering and amplification including at least one low noise amplifier (LNA) and may pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC MU-RTS from the physical layer service data unit (PSDU) of the EHT MU PPDU.

Figure 1D:
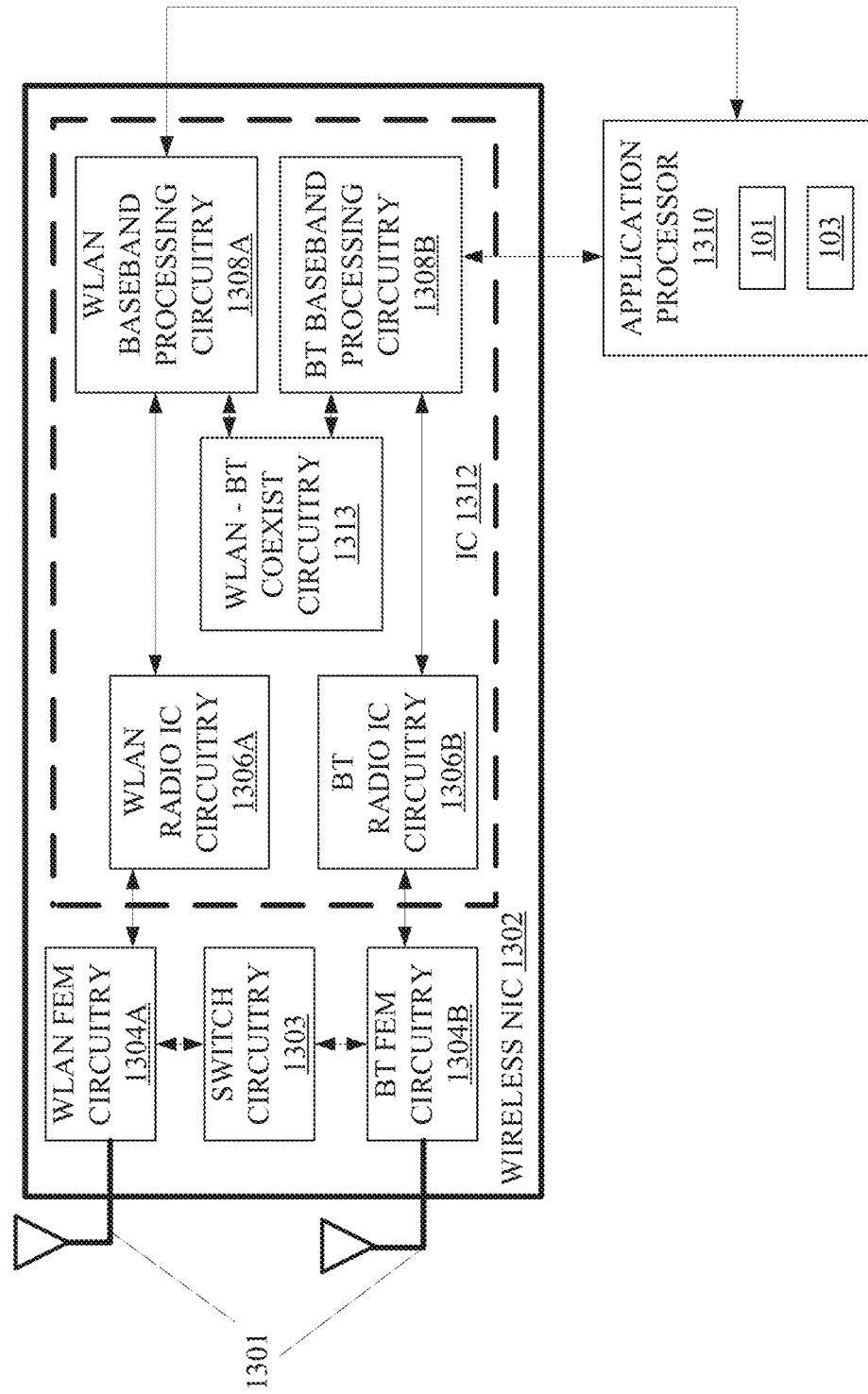
FIG. 1D illustrates an embodiment of a radio architecture for STAs, such as the wireless interfaces for STAs depicted in FIGS. 1A-C, to implement synchronization logic circuitry.

FIG. 1D is a block diagram of a radio architecture 1300 such as the wireless communications I/F 1222 and 1252 in accordance with some embodiments that may be implemented in, e.g., the AP MLD 1210 and/or the MLD STA 1230 of FIG. 1C. The radio architecture 1300 may include radio front-end module (FEM) circuitry 1304*a-b*, radio IC circuitry 1306*a-b* and baseband processing circuitry 1308*a-b*. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1301. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 1D, although FEM 1304*a* and FEM 1304*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308*a* and provide WLAN RF output signals to the FEM circuitry 1304*a* for subsequent wireless transmission by the one or more antennas 1301. BT radio IC circuitry 1306*b* may also include a transmit signal path which may include circuitry to up-convert BT baseband signals provided by the BT baseband processing circuitry 1308*b* and provide BT RF output signals to the FEM circuitry 1304*b* for subsequent wireless transmission by the one or more antennas 1301. In the embodiment of FIG. 1D, although radio IC circuitries 1306*a* and 1306*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308*a-b* may include a WLAN baseband processing circuitry 1308*a* and a BT baseband processing circuitry 1308*b*. The WLAN baseband processing circuitry 1308*a* may include a memory, such as, for example, a set of RAM arrays in a Fast Fourier Transform or Inverse Fast Fourier Transform block (not shown) of the WLAN baseband processing circuitry 1308*a*. Each of the WLAN baseband circuitry 1308*a* and the BT baseband circuitry 1308*b* may further include one or more processors and control logic to process the signals received from the corresponding WLAN or BT receive signal path of the radio IC circuitry 1306*a-b*, and to also generate corresponding WLAN or BT baseband signals for the transmit signal path of the radio IC circuitry 1306*a-b*. Each of the baseband processing circuitries 1308*a* and 1308*b* may further include physical layer (PHY) and medium access control layer (MAC) circuitry, and may further interface with a device for generation and processing of the baseband signals and for controlling operations of the radio IC circuitry 1306*a-b*.

Referring still to FIG. 1D, according to the shown embodiment, WLAN-BT coexistence circuitry 1313 may include logic providing an interface between the WLAN baseband circuitry 1308*a* and the BT baseband circuitry 1308*b* to enable use cases requiring WLAN and BT coexistence. In addition, a switch circuitry 1303 may be provided between the WLAN FEM circuitry 1304*a* and the BT FEM circuitry 1304*b* to allow switching between the WLAN and BT radios according to application needs. In addition, although the antennas 1301 are depicted as being respectively connected to the WLAN FEM circuitry 1304*a* and the BT FEM circuitry 1304*b*, embodiments include within their scope the sharing of one or more antennas as between the WLAN and BT FEMs, or the provision of more than one antenna connected to each of FEM 1304*a* or 1304*b*.

In some embodiments, the front-end module circuitry 1304*a-b*, the radio IC circuitry 1306*a-b*, and baseband processing circuitry 1308*a-b* may be provided on a single radio card, such as wireless network interface card (NIC) 1302. In some other embodiments, the one or more antennas 1301, the FEM circuitry 1304*a-b* and the radio IC circuitry 1306*a-b* may be provided on a single radio card. In some other embodiments, the radio IC circuitry 1306*a-b* and the baseband processing circuitry 1308*a-b* may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308*b* may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies, however.

Figure 1E:
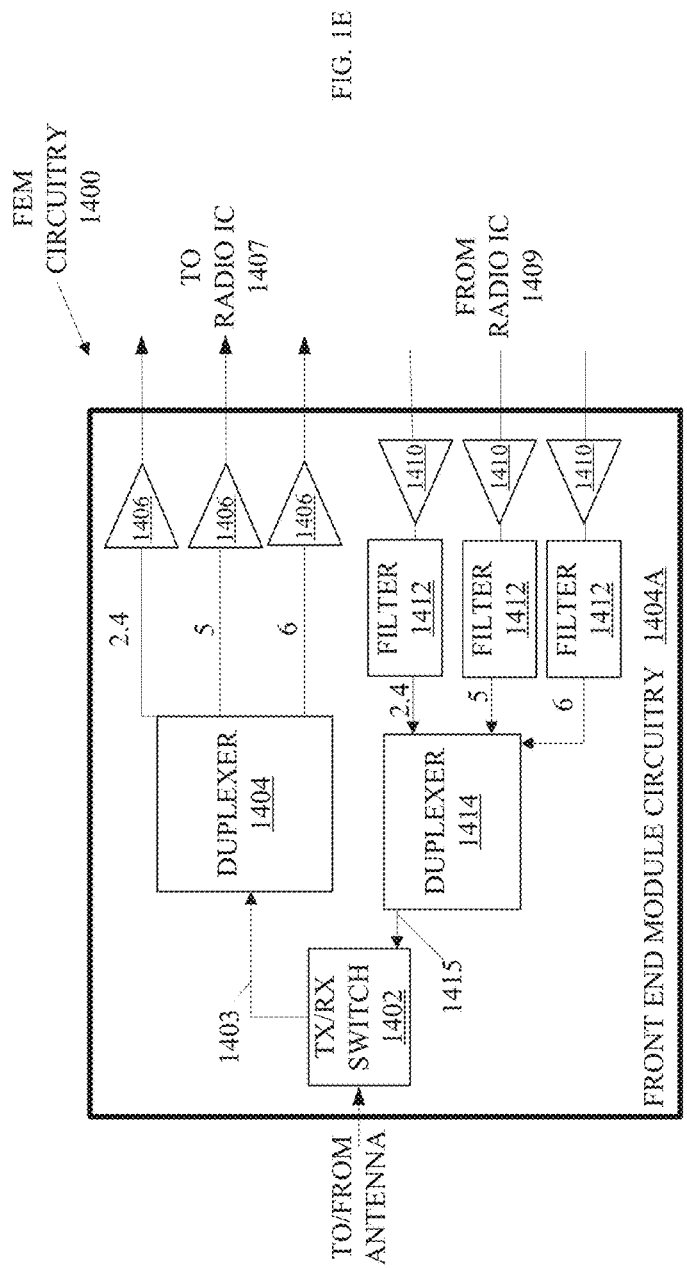
FIG. 1E illustrates an embodiment of front end module (FEM) circuitry of a wireless interface for STAs, such as the STAs in FIGS. 1A-C, to implement synchronization logic circuitry.

FIG. 1E illustrates FEM circuitry 1400 such as WLAN FEM circuitry 1304a shown in FIG. 1 D in accordance with some embodiments. Although the example of FIG. 1E is described in conjunction with the WLAN FEM circuitry 1304a, the example of FIG. 1E may be described in conjunction with other configurations such as the BT FEM circuitry 1304b.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306a-b (FIG. 1D)). The transmit signal path of the circuitry 1304a may include a power amplifier (PA) to amplify input RF signals 1409 (e.g., provided by the radio IC circuitry 1306a-b), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

Figure 1F:
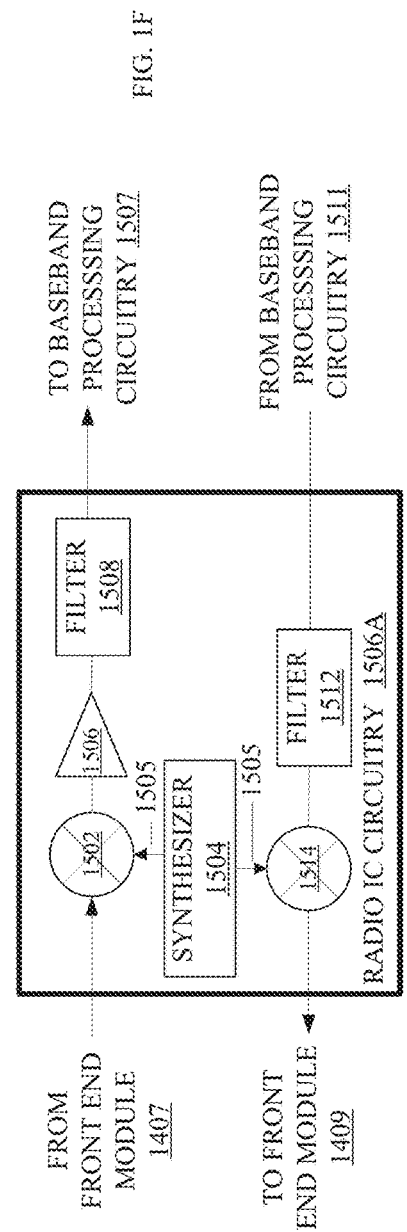
FIG. 1F illustrates an embodiment of radio integrated circuit (IC) circuitry of a wireless interface for STAs, such as the STAs in FIGS. 1A-C, to implement synchronization logic circuitry.

FIG. 1F illustrates radio IC circuitry 1506a in accordance with some embodiments. The radio IC circuitry 1306a is one example of circuitry that may be suitable for use as the WLAN or BT radio IC circuitry 1306a/1306b (FIG. 1D), although other circuitry configurations may also be suitable. Alternatively, the example of FIG. 1F may be described in conjunction with the example BT radio IC circuitry 1306b.

In some embodiments, the radio IC circuitry 1306a may include a receive signal path and a transmit signal path. The receive signal path of the radio IC circuitry 1306a may include at least mixer circuitry 1502, such as, for example, down-conversion mixer circuitry, amplifier circuitry 1506 and filter circuitry 1508. The transmit signal path of the radio IC circuitry 1306a may include at least filter circuitry 1512 and mixer circuitry 1514, such as, for example, upconversion mixer circuitry. Radio IC circuitry 1306a may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304a-b. The baseband signals 1511 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or upconversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct upconversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either of the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

FIG. 1G illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio IC circuitry 1306*a-b* (FIG. 1D) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1D, in some embodiments, the antennas 1301 (FIG. 1D) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

FIGS. 2A-2B illustrate embodiments of a timing measurement TM frame 2000 and a fin timing measurement (FTM) frame 2100. FIG. 2A illustrates an embodiment of TM frame 2000. The TM frame 2000 may comprise a vendor specific element that include an element identifier field, a length field, an organizationally unique number (OUI) or company identification (CID) field, a type field, a followup info field, and a preciseOriginTimestamp field. In some embodiments, the preciseOriginTimestamp field may include an adjusted leader clock value when the TM frame is transmitted from the leader or an adjusted follower clock value when the TM frame is transmitted from the follower. The adjusted follower clock value may comprise a sum of the local clock at the follower and the relative offset of the local clock at the follower from the local clock of the leader. The adjusted follower clock value may comprise a sum of the local clock at the leader and the relative offset of the local clock at the leader from the local clock of the follower.

Such embodiments may work well if the computed 'forward sync' offset is not large. In further embodiments, the synchronization logic circuitry may use a servo-based approach to adjust the local clock value in multiple steps involving smaller jumps. For instance, the synchronization logic circuitry may:

(a) not start Reverse Sync until the computed offset is small enough—e.g., include the size of the computed offset as a parameter in the definition of Stable State.

(b) start the Reverse Sync irrespective of the value of the computed offset and do not include computed offset to define Stable State. In such embodiments, the preciseOriginTimeStamp is not the adjusted local clock but the computed offset may be communicated as a separate value in Vendor-Specific (or Standards Organization Specific) information element in the [Fine] Timing Measurement frames sent in the Reverse direction.

As a comparison, FIG. 2B illustrates an embodiment of a fine timing management (FTM) frame 2100. The FTM frame 2100 may comprise a vendor specific element that include an element identifier field, a length field, an organizationally unique number (OUI) or company identification (CID) field, a type field, a followup info field, and a preciseOriginTimestamp field. In some embodiments, the FTM frame may also include a time synchronization performance information element (TSPIE). The TSPIE may comprise an element identifier field, a length field, an element extension ID field, and a time synchronization error threshold field. In some embodiment, the time synchronization error threshold field may contain a value that indicates the maximum synchronization error that a time sensitive application can tolerate such as 10 nanosecond or 20 nanoseconds.

Figure 2C:
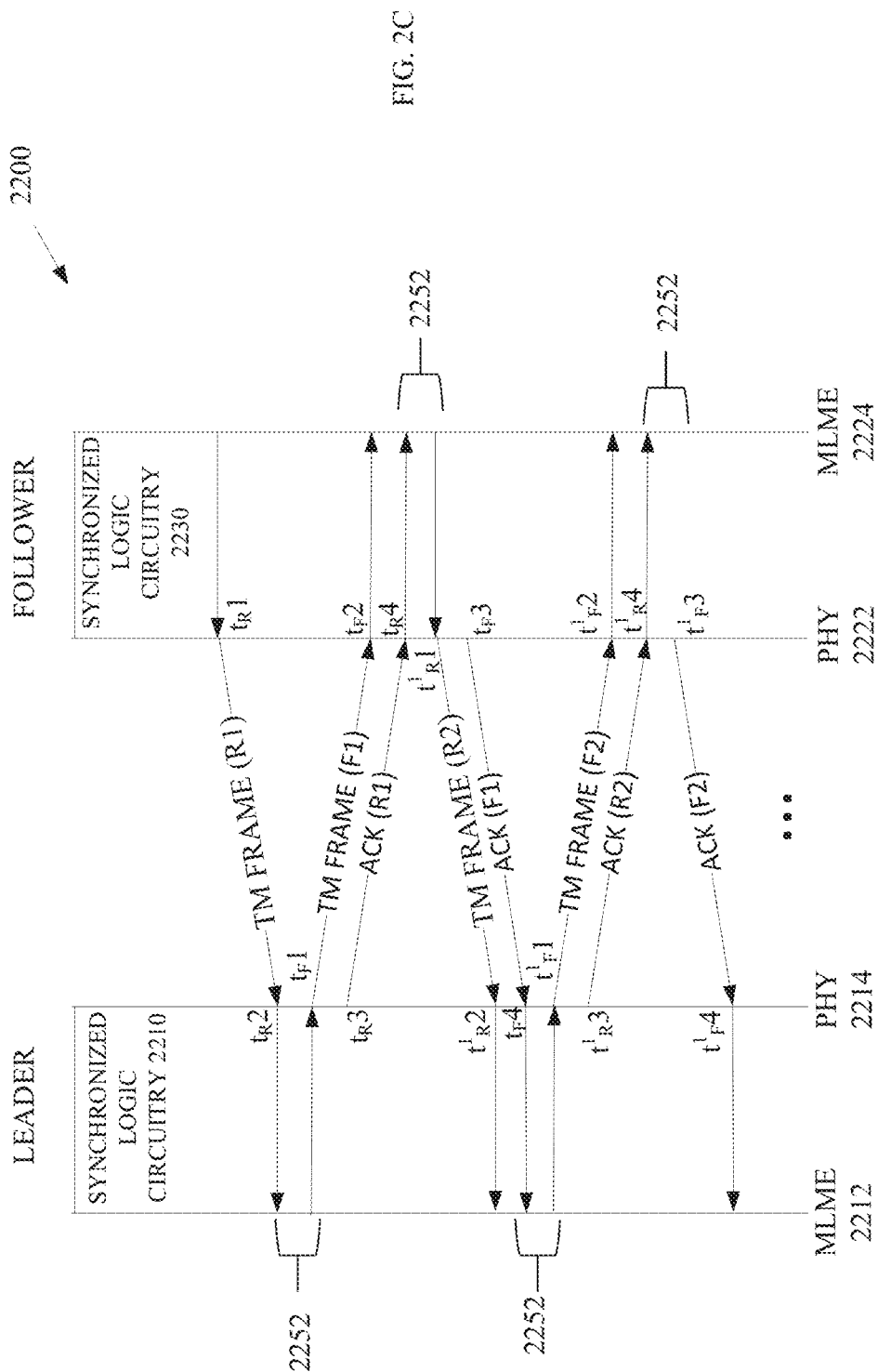
FIG. 2C depicts an embodiment of a time synchronization timing management session.

FIG. 2C illustrates an embodiment of a TM session 2200 between a leader and a follower. The TM session illustrates the relationship of the MAC layer management entity (MLME) 2212 and the PHY 2214 as well as the MLME 2224 and the PHY 2222 with respect to transmitting and receiving the TM frames during the TM session. The MLMEs 2212 and 2224 may instruct the PHY to transmit a TM frame or may parse, interpret and capture values from TM frames and ACK frames.

The synchronization logic circuitry 2230 of the follower may start the TM session by transmitting a TM frame (R1) for reverse sync at time $t_R1$ and capturing the time $t_R1$. The leader may receive the TM frame (R1) for reverse sync a time $t_R2$. Thereafter, at time $t_F1$, the synchronization logic circuitry 2210 of the leader may transit a TM frame (F1) for forward sync at time $t_F1$ and an acknowledgement (ACK) (R1) at time $t_R3$ in response to the TM frame (R1). The leader may include the times $t_R2$ and $t_R3$ in the ACK (R1). $t_R2$ may be the time of arrival of the TM frame (R1) at the leader. $t_R3$ may be the time of departure of the ACK (R1). The inclusion of the times $t_R2$ and $t_R3$ to the follower, provides the follower with information to calculate an offset between the clock of the leader and the clock of the follower. Furthermore, the time 2252 may comprise a default time, a preference or setting, or a negotiated time. The time 2252 is the time between arrival of the TM frame and transmission of a subsequent frame, which, as a minimum is a short interframe space (SIFS). A SIFS is defined as the minimum time for the STA to switch from a receiving mode to a transmission mode or vice versa.

The follower may receive the TM frame (F1) at time $t_F2$, and may transmit a TM frame (R2) at time $t^1_R1$. The TM frame (R2) may include a calculation of the offset between the leader clock and the clock of the follower in a field of the TM frame (R2) and/or the TM frame (R2) may include a calculation of the local clock of the follower plus the offset between the leader clock and the clock of the follower in a field of the TM frame (R2). The leader may receive the TM frame (R2) at time $t^1R2$. Similarly, after receipt of an ACK (F1) at time $t^1F1$, the leader may calculate the offset between the clock of the leader and/or the sum of the offset and the local clock of the leader.

The leader may transmit the TM frame (F2) at time $t^1_F1$ and the follower may receive the TM frame at time $t1_F2$. The leader may transmit the ACK (R2) at time $t^1_R3$ and the follower may receive the ACK (R2) at time $t^1_R4$.

At the end of the TM session, the follower may transmit an ACK (F2) at time $t^1_F3$ without transmitting another TM frame. The leader may receive the ACK (F2) at time $t^1_F4$.

Figure 2D:
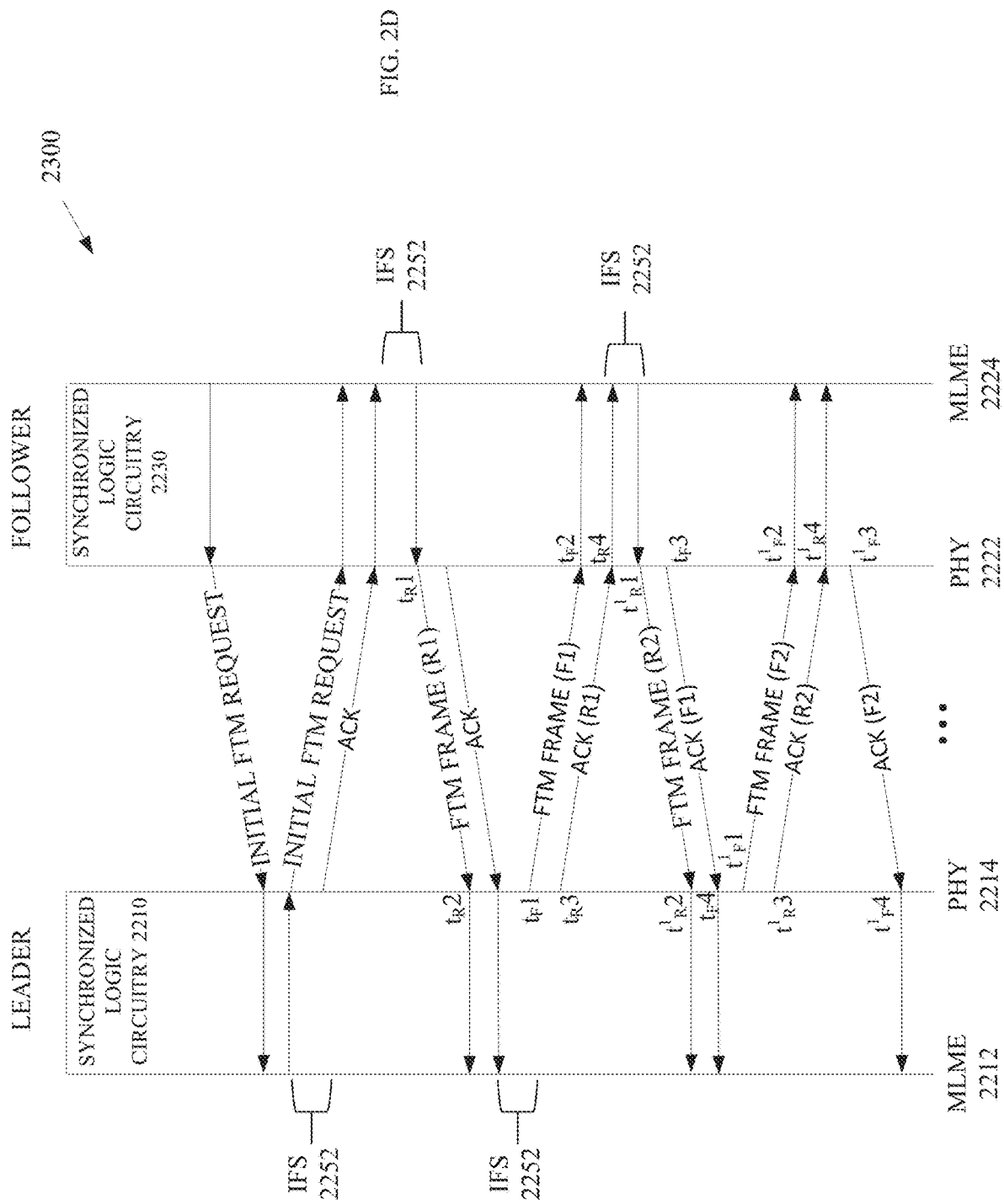
FIG. 2D depicts an embodiment of a time synchronization fine timing management session.

FIG. 2D illustrates an embodiment of a FTM session 2300 between a leader and a follower. The FTM session is similar to the TM session with a few differences. First, synchronization logic circuitry 2230 of the follower may initiate the FTM session by transmitting an initial FTM request frame. The initial FTM request frame may include parameters for the FTM session. If the leader accepts the parameters, the leader may transmit an initial FTM request frame that includes or is an indication that the leader accepts the parameters of the FTM session included in the initial FTM request frame from the follower. The leader may follow with transmission of an ACK frame, and the follower may transmit an ACK frame in response to receipt of the initial FTM request frame from the leader. On the other hand, if the leader rejects parameters in the initial FTM request frame from the follower, the FTM session ends with he receipt of the initial FTM request frame from the follower by the leader.

Second, the FTM session includes the forward sync and reverse sync with a burst of FTM frames rather than TM frames.

FIG. 3 depicts an embodiment of an apparatus to generate, transmit, receive, and interpret or decode PHY frames and MAC frames. The apparatus comprises a transceiver 3000 coupled with baseband processing circuitry 3001. The baseband processing circuitry 3001 may comprise a MAC logic circuitry 3091 and PHY logic circuitry 3092. In other embodiments, the baseband processing circuitry 3001 may be included on the transceiver 3000.

The MAC logic circuitry 3091 and PHY logic circuitry 3092 may comprise code executing on processing circuitry of a baseband processing circuitry 3001; circuitry to implement operations of functionality of the MAC or PHY; or a combination of both. In the present embodiment, the MAC logic circuitry 3091 and PHY logic circuitry 3092 may comprise synchronization logic circuitry 3093 to implement perform time synchronization and the determine a synchronization error based on the time synchronization to gauge performance of the time synchronization.

The MAC logic circuitry 3091 may determine a frame such as a MAC control frame and the PHY logic circuitry 3092 may determine the physical layer protocol data unit (PPDU) by prepending the frame, also called a MAC protocol data unit (MPDU), with a physical layer (PHY) preamble for transmission of the MAC control frame via the antenna array 3018 and cause transmission of the MAC control frame in the PPDU.

The transceiver 3000 comprises a receiver 3004 and a transmitter 3006. Embodiments have many different combinations of modules to process data because the configurations are deployment specific. FIG. 3 illustrates some of the modules that are common to many embodiments. In some embodiments, one or more of the modules may be implemented in circuitry separate from the baseband processing circuitry 3001. In some embodiments, the baseband processing circuitry 3001 may execute code in processing circuitry of the baseband processing circuitry 3001 to implement one or more of the modules.

In the present embodiment, the transceiver 3000 also includes WUR circuitry 3110 and 3120 such as the WUR circuitry 1024 and 1054, respectively, shown in FIG. 1A. The WUR circuitry 3110 may comprise circuitry to use portions of the transmitter 3006 (a transmitter of the wireless communications I/F) to generate a WUR packet. For instance, the WUR circuitry 3110 may generate, e.g., an OOK signal with OFDM symbols to generate a WUR packet for transmission via the antenna array 3018. In other embodiments, the WUR may comprise an independent circuitry that does not use portions of the transmitter 3006.

Note that a station such as the STA 1210 in FIG. 1C may comprise multiple transmitters to facilitate concurrent transmissions on multiple contiguous and/or non-contiguous carrier frequencies.

The transmitter 3006 may comprise one or more of or all the modules including an encoder 3008, a stream deparser 3066, a frequency segment parser 3007, an interleaver 3009, a modulator 3010, a frequency segment deparser 3060, an OFDM 3012, an Inverse Fast Fourier Transform (IFFT) module 3015, a GI module 3045, and a transmitter front end 3040. The encoder 3008 of transmitter 3006 receives and encodes a data stream destined for transmission from the MAC logic circuitry 3091 with, e.g., a binary convolutional coding (BCC), a low-density parity check coding (LDPC), and/or the like. After coding, scrambling, puncturing and post-FEC (forward error correction) padding, a stream parser 3064 may optionally divide the data bit streams at the output of the FEC encoder into groups of bits. The frequency segment parser 3007 may receive data stream from encoder 3008 or streams from the stream parser 3064 and optionally parse each data stream into two or more frequency segments to build a contiguous or non-contiguous bandwidth based upon smaller bandwidth frequency segments. The interleaver 3009 may interleave rows and columns of bits to prevent long sequences of adjacent noisy bits from entering a BCC decoder of a receiver.

The modulator 3010 may receive the data stream from interleaver 3009 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 3010 may optionally be fed into the frequency segment deparser 3060 to combine frequency segments in a single, contiguous frequency bandwidth of, e.g., 320 MHz. Other embodiments may continue to process the frequency segments as separate data streams for, e.g., a non-contiguous 160+160 MHz bandwidth transmission.

After the modulator 3010, the data stream(s) are fed to an OFDM 3012. The OFDM 3012 may comprise a space-time block coding (STBC) module 3011, and a digital beamforming (DBF) module 3014. The STBC module 3011 may receive constellation points from the modulator 3010 corresponding to one or more spatial streams and may spread the spatial streams to a greater number of space-time streams. Further embodiments may omit the STBC.

The OFDM 3012 impresses or maps the modulated data formed as OFDM symbols onto a plurality of orthogonal subcarriers, so the OFDM symbols are encoded with the subcarriers or tones. The OFDM symbols may be fed to the DBF module 3014. Generally, digital beam forming uses digital signal processing algorithms that operate on the signals received by, and transmitted from, an array of antenna elements. Transmit beamforming processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The IFFT module 3015 may perform an inverse discrete Fourier transform (IDFT) on the OFDM symbols to map on the subcarriers. The guard interval (GI) module 3045 may insert guard intervals by prepending to the symbol a circular extension of itself. The GI module 3045 may also comprise windowing to optionally smooth the edges of each symbol to increase spectral decay.

The output of the GI module 3045 may enter the radio 3042 to convert the time domain signals into radio signals by combining the time domain signals with subcarrier frequencies to output into the transmitter front end module (TX FEM) 3040. The transmitter front end 3040 may comprise a with a power amplifier (PA) 3044 to amplify the signal and prepare the signal for transmission via the antenna array

3018. In many embodiments, entrance into a spatial reuse mode by a communications device such as a station or AP may reduce the amplification by the PA 3044 to reduce channel interference caused by transmissions.

The transceiver 3000 may also comprise duplexers 3016 connected to antenna array 3018. The antenna array 3018 radiates the information bearing signals into a time-varying, spatial distribution of electromagnetic energy that can be received by an antenna of a receiver. In several embodiments, the receiver 3004 and the transmitter 3006 may each comprise its own antenna(s) or antenna array(s).

The transceiver 3000 may comprise a receiver 3004 for receiving, demodulating, and decoding information bearing communication signals. The receiver 3004 may comprise a receiver front-end module (RX FEM) 3050 to detect the signal, detect the start of the packet, remove the carrier frequency, and amplify the subcarriers via a low noise amplifier (LNA) 3054 to output to the radio 3052. The radio 3052 may convert the radio signals into time domain signals to output to the GI module 3055 by removing the subcarrier frequencies from each tone of the radio signals.

The receiver 3004 may comprise a GI module 3055 and a fast Fourier transform (FFT) module 3019. The GI module 3055 may remove the guard intervals and the windowing and the FFT module 3019 may transform the communication signals from the time domain to the frequency domain.

The receiver 3004 may also comprise an OFDM 3022, a frequency segment parser 3062, a demodulator 3024, a deinterleaver 3025, a frequency segment deparser 3027, a stream deparser 3066, and a decoder 3026. An equalizer may output the weighted data signals for the OFDM packet to the OFDM 3022. The OFDM 3022 extracts signal information as OFDM symbols from the plurality of subcarriers onto which information-bearing communication signals are modulated.

The OFDM 3022 may comprise a DBF module 3020, and an STBC module 3021. The received signals are fed from the equalizer to the DBF module 3020. The DBF module 3020 may comprise algorithms to process the received signals as a directional transmission directed toward to the receiver 3004. And the STBC module 3021 may transform the data streams from the space-time streams to spatial streams.

The output of the STBC module 3021 may enter a frequency segment parser 3062 if the communication signal is received as a single, contiguous bandwidth signal to parse the signal into, e.g., two or more frequency segments for demodulation and deinterleaving.

The demodulator 3024 demodulates the spatial streams. Demodulation is the process of extracting data from the spatial streams to produce demodulated spatial streams. The deinterleaver 3025 may deinterleave the sequence of bits of information. The frequency segment deparser 3027 may optionally deparse frequency segments as received if received as separate frequency segment signals or may deparse the frequency segments determined by the optional frequency segment parser 3062. The decoder 3026 decodes the data from the demodulator 3024 and transmits the decoded information, the MPDU, to the MAC logic circuitry 3091.

The MAC logic circuitry 3091 may parse the MPDU based upon a format defined in the communications device for a frame to determine the particular type of frame by determining the type value and the subtype value. The MAC logic circuitry 3091 may then interpret the remainder of MPDU.

While the description of FIG. 3 focuses primarily on a single spatial stream system for simplicity, many embodiments are capable of multiple spatial stream transmissions and use parallel data processing paths for multiple spatial streams from the PHY logic circuitry 3092 through to transmission. Further embodiments may include the use of multiple encoders to afford implementation flexibility.

Figure 4A:
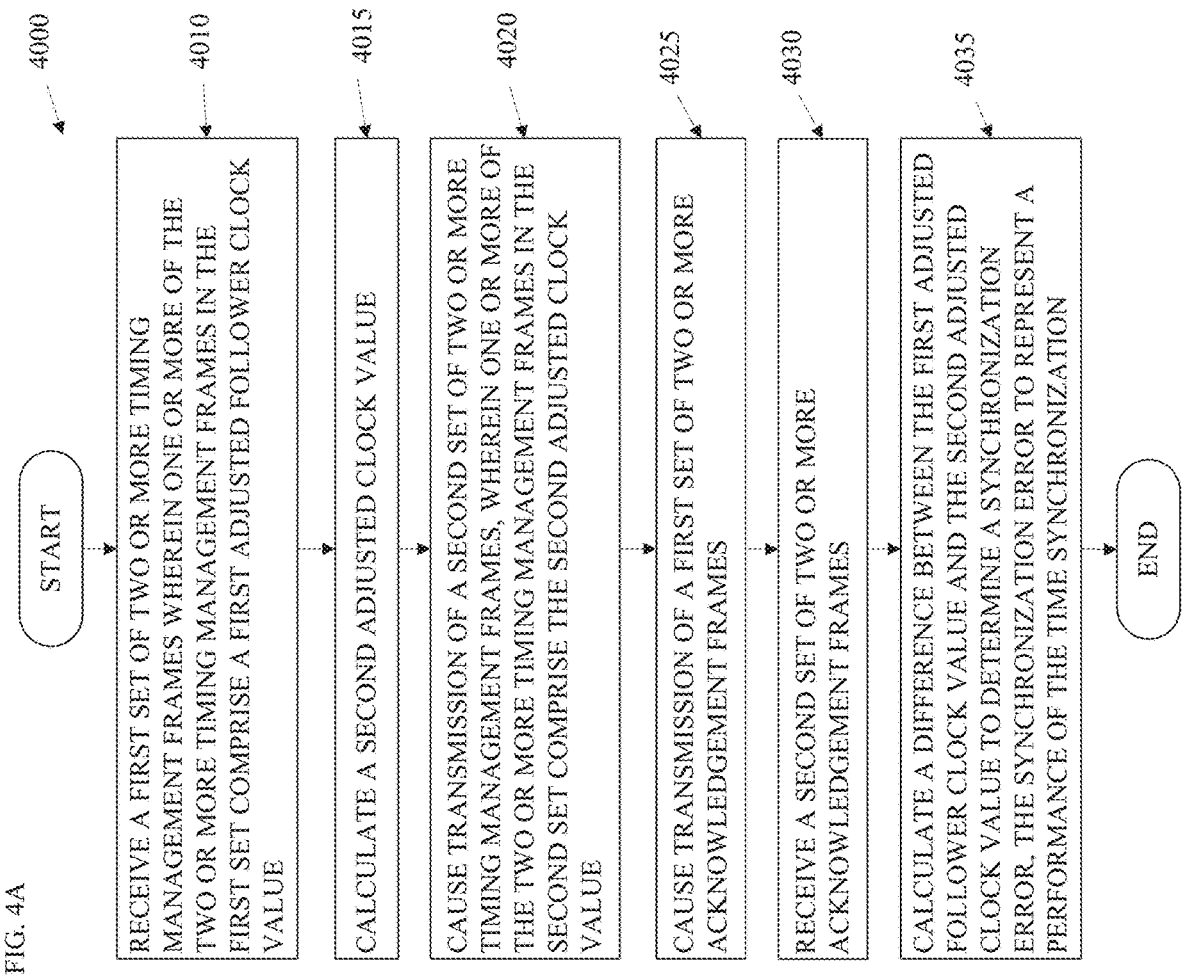
FIG. 4A depicts an embodiment of a flowchart to implement synchronization logic circuitry.

FIG. 4A depicts an embodiment of a flowchart 4000 to implement synchronization logic circuitry such as the synchronization logic circuitry discussed in FIGS. 1-3. At element 4010, synchronization logic circuitry of leader (e.g., the synchronization logic circuitry 1220 of the AP MLD 1210) may receive a first set of two or more timing management frames wherein one or more of the two or more timing management frames in the first set comprise a first adjusted follower clock value. The first set of two or more timing management frames may comprise part of a reverse sync.

At element 4015, synchronization logic circuitry of leader may cause transmission of a second set of two or more timing management frames, wherein one or more of the two or more timing management frames in the second set comprise a second adjusted clock value. The second set of two or more timing management frames may comprise part of a forward sync. In some embodiments, the TM frames of the two set may be interleaved such as the TM frames shown in FIG. 2C. In other embodiments, the interleaving may be performed in a different pattern such as two forward sync TM frames for each reverse sync TM frame, or vice versa.

At element 4020, synchronization logic circuitry of leader may cause transmission of a first set of two or more acknowledgement frames. And at element 4025, synchronization logic circuitry of leader may receive a second set of two or more acknowledgement frames. Note that these frames may be interleaved with the first and second sets of TM frames based on the interleaving of the TM frames. It is understood that the above descriptions are for purposes of illustration and are not meant to be limiting.

At element 4030, synchronization logic circuitry of leader may calculate a second adjusted clock value. At element 4035, synchronization logic circuitry of leader may calculate a difference between the first adjusted follower clock value and the second adjusted clock value to determine a synchronization error, the synchronization error to represent a performance of the time synchronization. In some embodiments, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. In some embodiments, calculation of the difference comprises calculation in response to receipt of each acknowledgement in the second set of acknowledgement frames.

In some embodiments, the synchronization logic circuitry may further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame. In other words, the TM session may be an FTM session or at least the forward sync or the reverse sync may include FTM frames. In such embodiments, the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames.

Figure 4B:
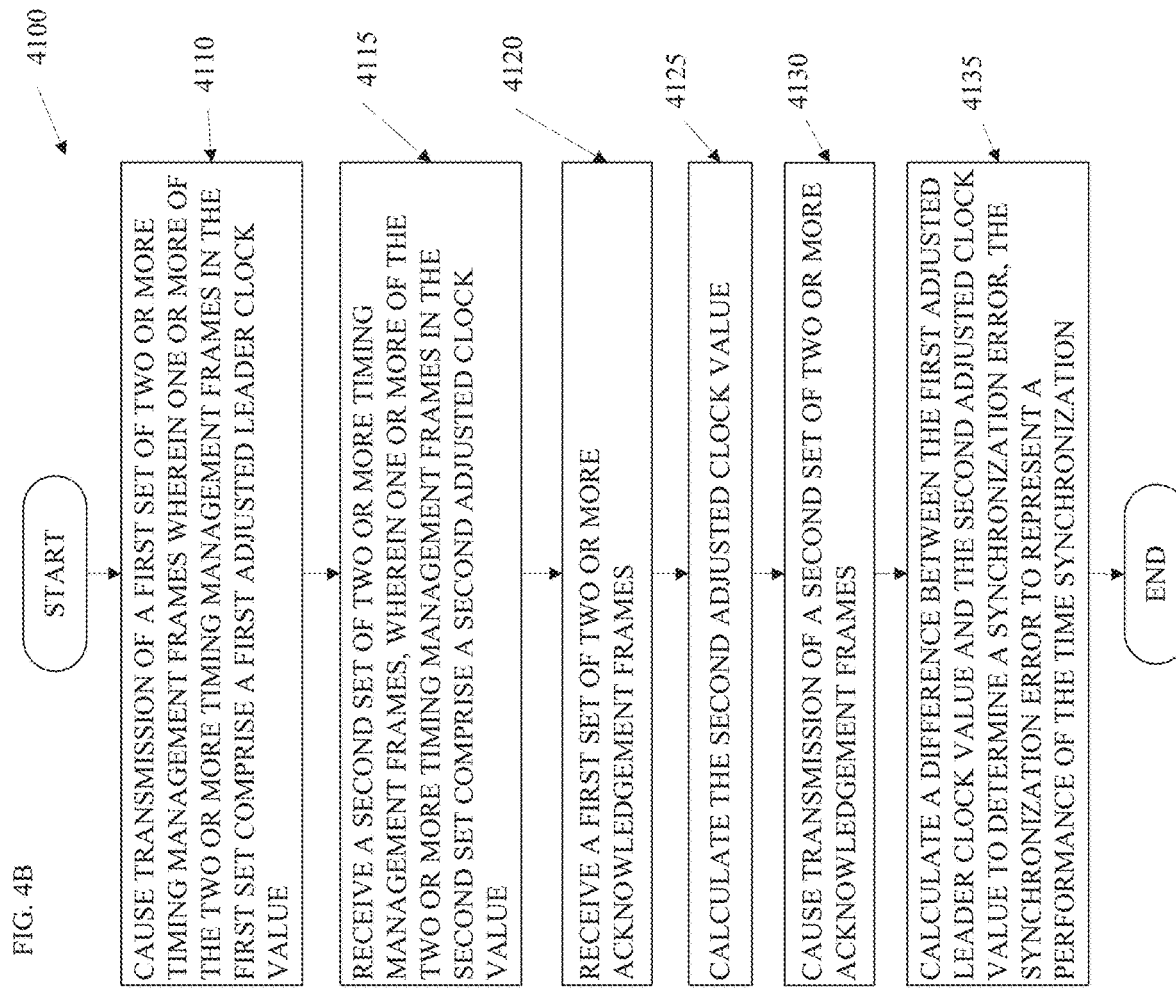
FIG. 4B depicts another embodiment of a flowchart to implement synchronization logic circuitry.

FIG. 4B depicts another embodiment of a flowchart 4100 to implement synchronization logic circuitry. At element 4110, synchronization logic circuitry of a follower (e.g., the synchronization logic circuitry 1250 of MLD STA 1230 shown FIG. 1C) may cause transmission of a first set of two or more timing management frames wherein one or more of the two or more timing management frames in the first set comprise a first adjusted leader clock value.

At element 4115, the follower may receive a second set of two or more timing management frames, wherein one or more of the two or more timing management frames in the second set comprise a second adjusted clock value. In some embodiments, the synchronization logic circuitry may further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame.

In element 4120, the follower may receive a first set of two or more acknowledgement frames. In element 4125, the follower may calculate the second adjusted clock value. In some embodiments, the first adjusted leader clock value may comprise a sum of the local clock at the leader and the relative offset of the local clock at the leader from the local clock of the follower and the second adjusted clock value may comprise a sum of the local clock at the follower and the relative offset of the local clock at the follower from the local clock of the leader.

In element 4130, the follower may cause transmission of a second set of two or more acknowledgement frames. In some embodiments, the time frame between receipt of a time management frame in the first set of time management frames and transmission of a time management frame in the second set of time management frames is a minimum of a short interframe space In element 4135, the follower may calculate a difference between the first adjusted leader clock value and the second adjusted clock value to determine a synchronization error, the synchronization error to represent a performance of the time synchronization.

Figures 4C, 4D:
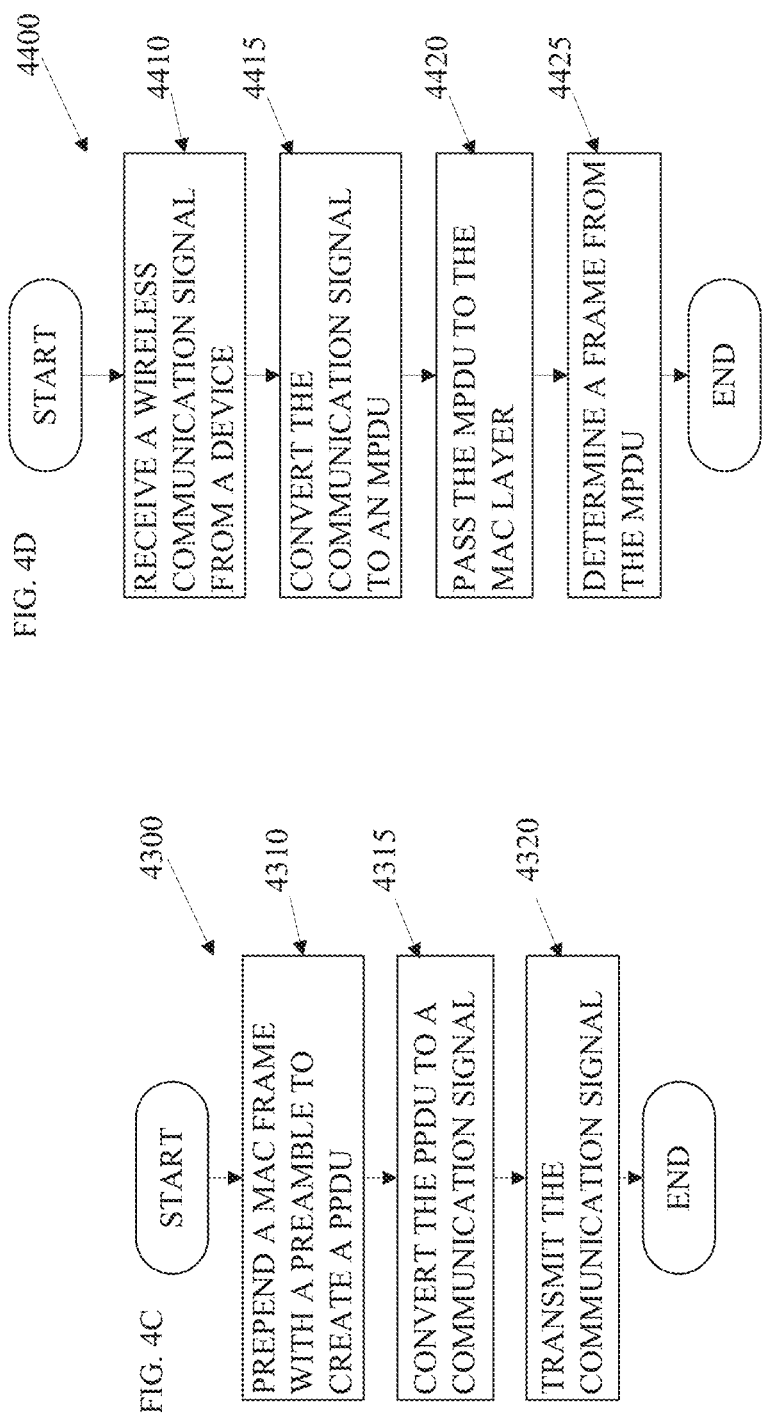
FIGS. 4C-D depict embodiments of flowcharts to generate and transmit frames and receive and interpret frames for communications between wireless communication devices.

FIGS. 4C-D depict embodiments of flowcharts 4300 and 4410 to transmit, receive, and interpret communications with a frame. Referring to FIG. 4C, the flowchart 4300 may begin with receiving an MU frame from the wireless communications I/F 1216 of the STA 1210 by the wireless communications I/Fs (such as wireless communications I/F 1246 of the STA 1230, STA 1290, STA 1292, and STA 1296 as shown in FIG. 1C. The MAC layer logic circuitry, such as the MAC logic circuitry 3091 in FIG. 1C, of each STA of STA 1230, STA 1290, STA 1292, and STA 1296 may generate a control frame responsive to the MU frame to transmit to the STA 1210 as a control frame to the STA 1210 and may pass the frame as an MAC protocol data unit (MPDU) to a PHY logic circuitry such as the PHY logic circuitry 3092 in FIG. 1C. The PHY logic circuitry may also encode and transform the PPDU into OFDM symbols for transmission to the STA 1210. The PHY logic circuitry may generate a preamble to prepend the PHY service data unit (PSDU) (the MPDU) to form a PHY protocol data unit (PPDU) for transmission (element 4310).

The physical layer device such as the transmitter 3006 in FIG. 3 or the wireless network interfaces 1222 and 1252 in FIG. 1A may convert the PPDU to a communication signal via a radio (element 4315). The transmitter may then transmit the communication signal via the antenna coupled with the radio (element 4320).

Referring to FIG. 4D, the flowchart 4410 begins with a receiver of a device such as the receiver 3004 in FIG. 3 receiving a communication signal via one or more antenna (s) such as an antenna element of antenna array 3018 (element 4420). The receiver may convert the communication signal into an MPDU in accordance with the process described in the preamble (element 4425). More specifically, the received signal is fed from the one or more antennas to a DBF such as the DBF 220. The DBF transforms the antenna signals into information signals. The output of the DBF is fed to OFDM such as the OFDM 3022 in FIG. 3. The OFDM extracts signal information from the plurality of subcarriers onto which information-bearing signals are modulated. Then, the demodulator such as the demodulator 3024 demodulates the signal information via, e.g., BPSK, 16-QAM (quadrature amplitude modulation), 64-QAM, 256-QAM, 1024-QAM, or 4096-QAM with a forward error correction (FEC) coding rate ($\frac{1}{2}$, $\frac{2}{3}$, $\frac{3}{4}$, or $\frac{5}{6}$). And the decoder such as the decoder 3026 decodes the signal information from the demodulator via, e.g., BCC or LDPC, to extract the MPDU and pass or communicate the MPDU to MAC layer logic circuitry such as MAC logic circuitry 3091 (element 4420).

The MAC logic circuitry may determine frame field values from the MPDU (element 4425) such as the control frame fields in the control frame shown in FIG. 2F. For instance, the MAC logic circuitry may determine frame field values such as the type and subtype field values of the control frame. The MAC logic circuitry may determine that the MPDU comprises a control frame so the MAC logic circuitry may generate a frame in response if the sub-band of the channel is clear according to a directional CCA.

Figure 5:
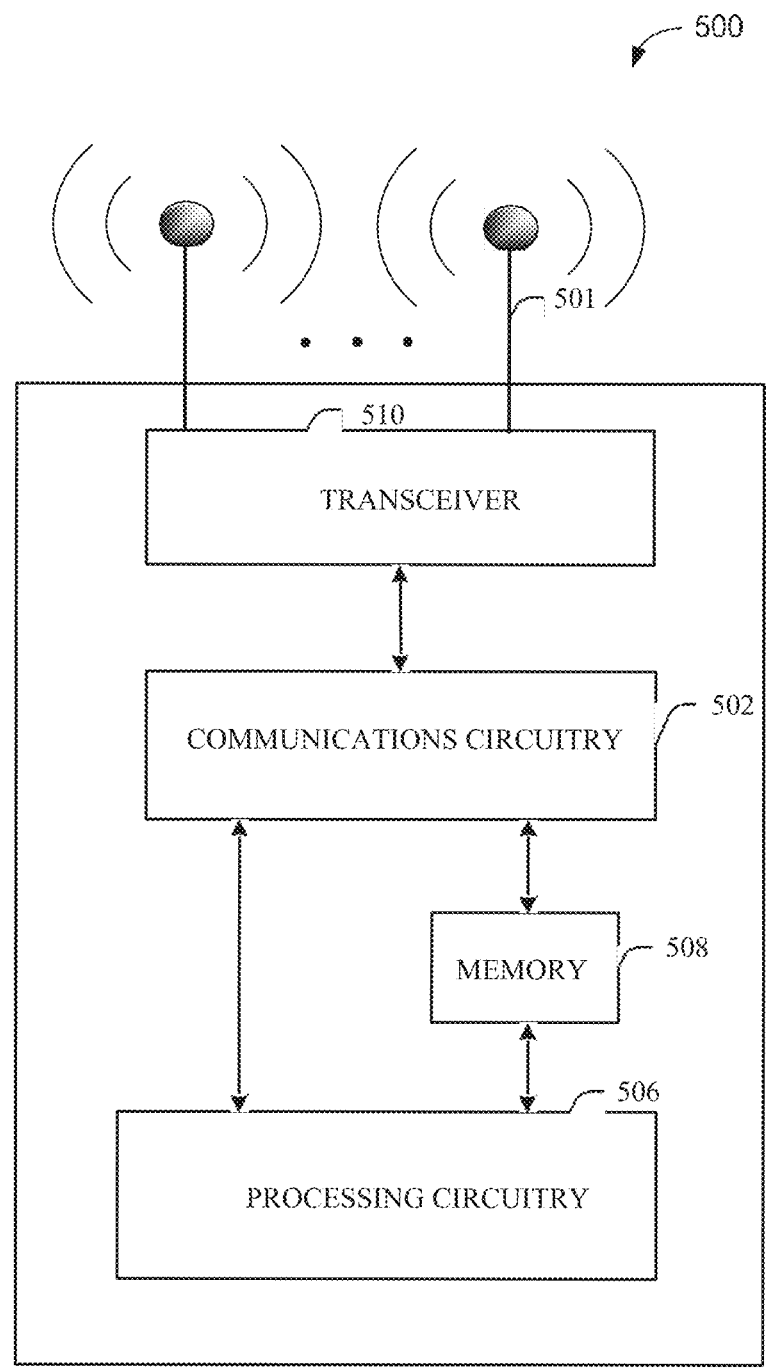
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 1005 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry

506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
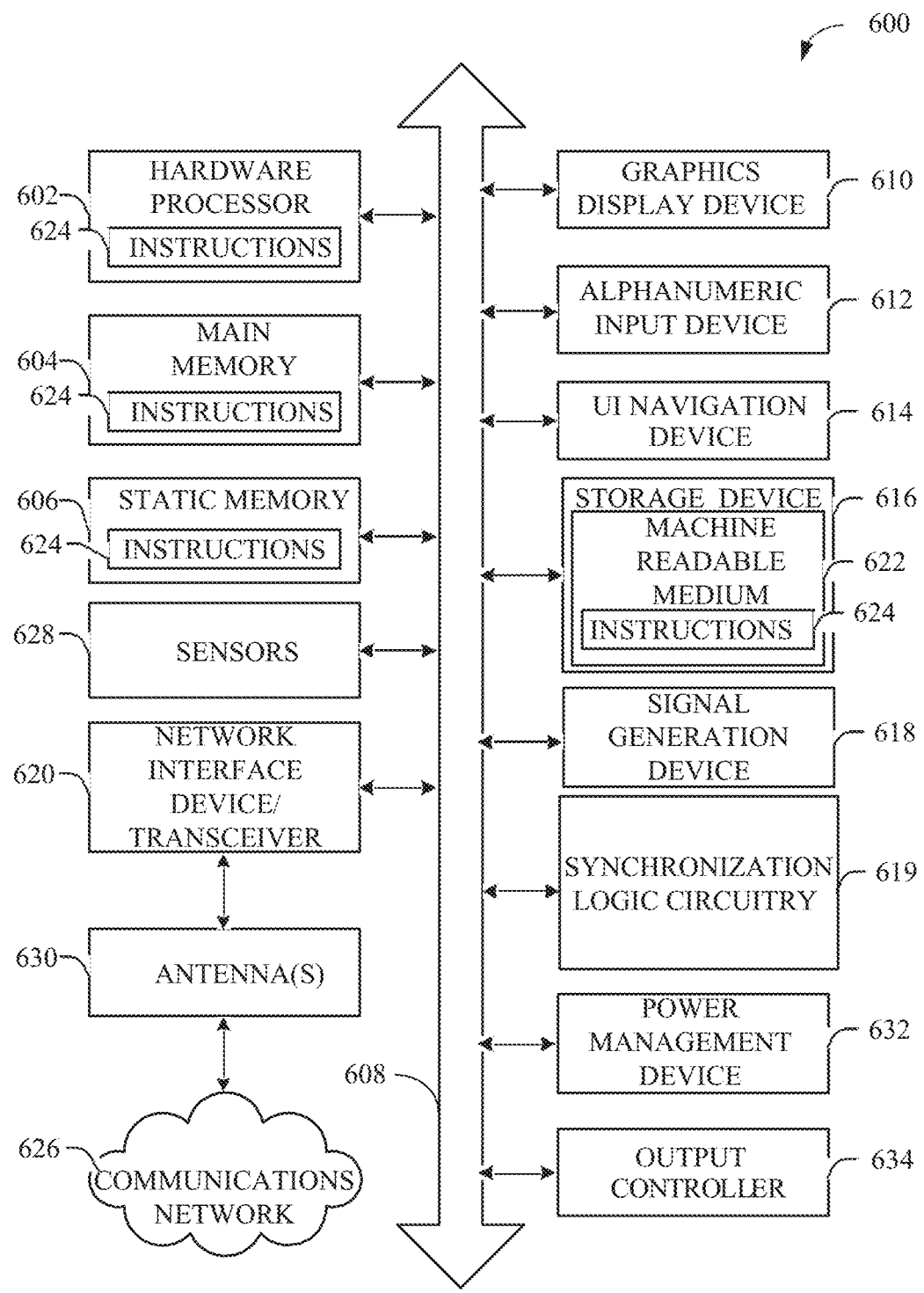
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices, and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a synchronization logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the synchronization logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The synchronization logic circuitry 619 may carry out or perform any of the operations and processes in relation to monitoring time synchronization by a retiming measurement frame transmitted by an AP MLD acting as a channel enabler for a first STA in a 2.4 GHz, 5 GHz, or 6 GHz channel or the like (e.g., flowchart 4000 shown in FIG. 4A, flowchart 4100 shown in FIG. 4B, and flowchart 4200 shown in FIG. 4C) described and shown above. It is understood that the above are only a subset of what the synchronization logic circuitry 619 may be configured to perform and that other functions included throughout this disclosure may also be performed by the synchronization logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
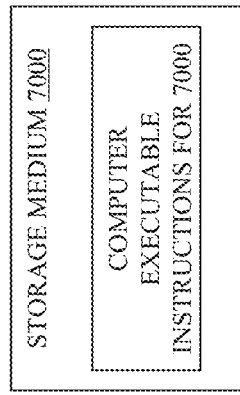
FIGS. 7-8 depict embodiments of a computer-readable storage medium and a computing platform to implement synchronization logic circuitry.

FIG. 7 illustrates an example of a storage medium 7000 to store assessment logic such as logic to implement the synchronization logic circuitry 619 shown in FIG. 6 and/or the other logic discussed herein perform resource assessment for P2P STAs. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
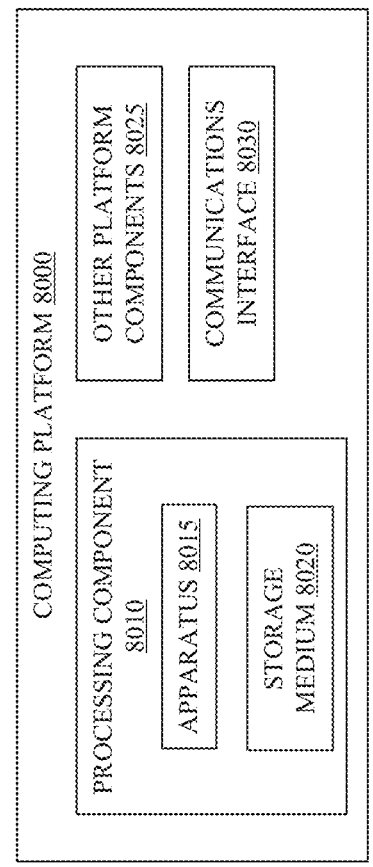

FIG. 8 illustrates an example computing platform 8000 such as the MLD STAs 1210, 1230, 1290, 1292, 1294, 1296, and 1298 in FIG. 1A. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of synchronization logic circuitry, advantageously allows operation of time-sensitive applications. With the proposed mechanism when 802.11 is the communication medium between two nodes in a time-sensitive network, the corresponding time synchronization performance can be estimated on demand by the execution of the Reverse Sync procedure (exchange of additional messages between the two nodes) to estimate how tightly the clock at the Follower (the node that gets it time synchronized to) is synchronized with that of the Leader (the node that provides the time value and additional information needed for the Follower to synchronize its local clock). This estimate may advantageously be used at the Follower to determine if the time synchronization meets the requirements of the application(s) supported over the time-sensitive network; and if not, advantageously trigger mitigating mechanisms (e.g., modify the parameters used for executing time synchronization protocol, explore possibilities of switching to better wireless channels, etc.) and restore time synchronization performance to acceptable levels.

Examples of Further Embodiments

The following examples pertain to further embodiments. Specifics in the examples may be used anywhere in one or more embodiments.

Example 1 is an apparatus comprising: a memory; and logic circuitry of a leader device coupled with the memory to: receive a first set of two or more timing management frames wherein one or more of the two or more timing management frames in the first set comprise a first adjusted follower clock value; cause transmission of a second set of two or more timing management frames, wherein one or more of the two or more timing management frames in the second set comprise a second adjusted clock value; cause transmission of a first set of two or more acknowledgement frames; receive a second set of two or more acknowledgement frames; and calculate a second adjusted clock value; calculate a difference between the first adjusted follower clock value and the second adjusted clock value to determine a synchronization error, the synchronization error to represent a performance of the time synchronization. Example 2 is the apparatus of Example 1, wherein the logic circuitry comprises baseband processing circuitry and further comprising a radio coupled with the baseband processing circuitry, and one or more antennas coupled with the radio to transmit. Example 3 is the apparatus of Example 1, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. Example 4 is the apparatus of Example 1, the logic circuitry to further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame. Example 5 is the apparatus of Example 4, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 6 is the apparatus of Example 4, wherein the first set of two or more timing management frames and the second of two or more timing management frames comprise fine timing management frames. Example 7 is the apparatus of Example 6, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 8 is the apparatus of Example 1, wherein calculation of the difference comprises calculation in response to receipt of each acknowledgement in the second set of acknowledgement frames. Example 9 is the apparatus of Example 8, wherein the time frame between receipt of a time management frame in the first set of time management frames and transmission of a time management frame in the second set of time management frames is a minimum of a short interframe space.

Example 10 is a non-transitory computer-readable medium, comprising instructions, which when executed by a processor, cause the processor to perform operations to: receive a first set of two or more timing management frames wherein one or more of the two or more timing management frames in the first set comprise a first adjusted follower clock value; cause transmission of a second set of two or more timing management frames, wherein one or more of the two or more timing management frames in the second set comprise a second adjusted clock value; cause transmission of a first set of two or more acknowledgement frames; receive a second set of two or more acknowledgement frames; and calculate a second adjusted clock value; calculate a difference between the first adjusted follower clock value and the second adjusted clock value to determine a synchronization error, the synchronization error to represent a performance of the time synchronization. Example 11 is the non-transitory computer-readable medium of Example 10, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. Example 12 is the non-transitory computer-readable medium of Example 10, the operations to further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame. Example 13 is the non-transitory computer-readable medium of Example 12, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 14 is the non-transitory computer-readable medium of Example 12, wherein the first set of two or more timing management frames and the second of two or more timing management frames comprise fine timing management frames. Example 15 is the non-transitory computer-readable medium of Example 14, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 16 is the non-transitory computer-readable medium of Example 10, wherein calculation of the difference comprises calculation in response to receipt of each acknowledgement in the second set of acknowledgement frames. Example 17 is the non-transitory computer-readable medium of Example 16, wherein the time frame between receipt of a time management frame in the first set of time management frames and transmission of a time management frame in the second set of time management frames is a minimum of a short interframe space.

Example 18 is a method comprising: receiving a first set of two or more timing management frames wherein one or more of the two or more timing management frames in the first set comprise a first adjusted follower clock value; causing transmission of a second set of two or more timing management frames, wherein one or more of the two or more timing management frames in the second set comprise a second adjusted clock value; transmitting a first set of two or more acknowledgement frames; receiving a second set of two or more acknowledgement frames; and calculating the second adjusted clock value; calculating a difference between the first adjusted follower clock value and the second adjusted clock value to determine a synchronization error, the synchronization error to represent a performance of the time synchronization. Example 19 is the method of Example 18, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. Example 20 is the method of Example 18, further comprising receiving a first initial fine timing management frame, causing transmission of a second initial fine timing frame in response to receipt of the first fine timing management frame, causing transmission of an acknowledgement in response to receipt of the first fine timing management frame, and receiving an acknowledgement in response to the transmission of a second initial fine timing frame. Example 21 is the method of Example 20, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 22 is the method of Example 20, wherein the first set of two or more timing management frames and the second of two or more timing management frames comprise fine timing management frames. Example 23 is the method of Example 22, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 24 is the method of Example 18, wherein calculation of the difference comprises calculation in response to receipt of each acknowledgement in the second set of acknowledgement frames. Example 25 is the method of Example 24, wherein the time frame between receipt of a time management frame in the first set of time management frames and transmission of a time management frame in the second set of time management frames is a minimum of a short interframe space.

Example 26 is an apparatus comprising: a means for receiving a first set of two or more timing management frames wherein one or more of the two or more timing management frames in the first set comprise a first adjusted follower clock value; a means for causing transmission of a second set of two or more timing management frames, wherein one or more of the two or more timing management frames in the second set comprise a second adjusted clock value; a means for transmitting a first set of two or more acknowledgement frames; a means for receiving a second set of two or more acknowledgement frames; and a means for calculating the second adjusted clock value; a means for calculating a difference between the first adjusted follower clock value and the second adjusted clock value to determine a synchronization error, the synchronization error to represent a performance of the time synchronization. Example 27 is the apparatus of Example 26, the first adjusted follower clock value comprising a sum of the local clock at the follower and the relative offset of the local clock at the follower from the local clock of the leader and the second adjusted clock value comprising a sum of the local clock at the leader and the relative offset of the local clock at the leader from the local clock of the follower. Example 28 is the apparatus of Example 26, further comprising receiving a first initial fine timing management frame, causing transmission of a second initial fine timing frame in response to receipt of the first fine timing management frame, causing transmission of an acknowledgement in response to receipt of the first fine timing management frame, and receiving an acknowledgement in response to the transmission of a second initial fine timing frame. Example 29 is the apparatus of Example 28, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 30 is the apparatus of Example 28, wherein the first set of two or more timing management frames and the second of two or more timing management frames comprise fine timing management frames. Example 31 is the apparatus of Example 30, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 32 is the apparatus of Example 26, wherein calculation of the difference comprises calculation in response to receipt of each acknowledgement in the second set of acknowledgement frames. Example 33 is the apparatus of Example 32, wherein the time frame between receipt of a time management frame in the first set of time management frames and transmission of a time management frame in the second set of time management frames is a minimum of a short interframe space.

Example 34 is an apparatus comprising: a memory; and logic circuitry of a follower device coupled with the memory to: cause transmission of a first set of two or more timing management frames wherein one or more of the two or more timing management frames in the first set comprise a first adjusted leader clock value; receive a second set of two or more timing management frames, wherein one or more of the two or more timing management frames in the second set comprise a second adjusted clock value; receive a first set of two or more acknowledgement frames;

calculate the second adjusted clock value; cause transmission of a second set of two or more acknowledgement frames; and calculate a difference between the first adjusted leader clock value and the second adjusted clock value to determine a synchronization error, the synchronization error to represent a performance of the time synchronization. Example 35 is the apparatus of Example 34, wherein the logic circuitry comprises baseband processing circuitry and further comprising a radio coupled with the baseband processing circuitry, and one or more antennas coupled with the radio to transmit. Example 36 is the apparatus of Example 34, the first adjusted leader clock value comprising a sum of the local clock at the leader and the relative offset of the local clock at the leader from the local clock of the follower and the second adjusted clock value comprising a sum of the local clock at the follower and the relative offset of the local clock at the follower from the local clock of the leader. Example 37 is the apparatus of Example 36, the logic circuitry to further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame. Example 38 is the apparatus of Example 37, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 39 is the apparatus of Example 37, wherein the first set of two or more timing management frames and the second of two or more timing management frames comprise fine timing management frames. Example 40 is the apparatus of Example 39, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 41 is the apparatus of Example 34, wherein calculation of the difference comprises calculation in response to receipt of each acknowledgement in the second set of acknowledgement frames. Example 42 is the apparatus of Example 34, wherein the time frame between receipt of a time management frame in the first set of time management frames and transmission of a time management frame in the second set of time management frames is a minimum of a short interframe space.

Example 43 is a non-transitory computer-readable medium, comprising instructions, which when executed by a processor, cause the processor to perform operations to: cause transmission of a first set of two or more timing management frames wherein one or more of the two or more timing management frames in the first set comprise a first adjusted leader clock value; receive a second set of two or more timing management frames, wherein one or more of the two or more timing management frames in the second set comprise a second adjusted clock value; receive a first set of two or more acknowledgement frames; calculate the second adjusted clock value; cause transmission of a second set of two or more acknowledgement frames; and calculate a difference between the first adjusted leader clock value and the second adjusted clock value to determine a synchronization error, the synchronization error to represent a performance of the time synchronization. Example 44 is the non-transitory computer-readable medium of Example 43, the first adjusted leader clock value comprising a sum of the local clock at the leader and the relative offset of the local clock at the leader from the local clock of the follower and the second adjusted clock value comprising a sum of the local clock at the follower and the relative offset of the local clock at the follower from the local clock of the leader. Example 45 is the non-transitory computer-readable medium of Example 44, the operations to further receive a first initial fine timing management frame, cause transmission of a second initial fine timing frame in response to receipt of the first fine timing management frame, cause transmission of an acknowledgement in response to receipt of the first fine timing management frame, and receive an acknowledgement in response to the transmission of a second initial fine timing frame. Example 46 is the non-transitory computer-readable medium of Example 45, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 47 is the non-transitory computer-readable medium of Example 45, wherein the first set of two or more timing management frames and the second of two or more timing management frames comprise fine timing management frames. Example 48 is the non-transitory computer-readable medium of Example 47, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 49 is the non-transitory computer-readable medium of Example 43, wherein calculation of the difference comprises calculation in response to receipt of each acknowledgement in the second set of acknowledgement frames. Example 50 is the non-transitory computer-readable medium of Example 43, wherein the time frame between receipt of a time management frame in the first set of time management frames and transmission of a time management frame in the second set of time management frames is a minimum of a short interframe space.

Example 50 is a method comprising: causing transmission of a first set of two or more timing management frames wherein one or more of the two or more timing management frames in the first set comprise a first adjusted leader clock value; receiving a second set of two or more timing management frames, wherein one or more of the two or more timing management frames in the second set comprise a second adjusted clock value; receiving a first set of two or more acknowledgement frames; calculating the second adjusted clock value; causing transmission of a second set of two or more acknowledgement frames; and calculating a difference between the first adjusted leader clock value and the second adjusted clock value to determine a synchronization error, the synchronization error to represent a performance of the time synchronization. Example 51 is the method of Example 50, wherein the logic circuitry comprises baseband processing circuitry and further comprising a radio coupled with the baseband processing circuitry, and one or more antennas coupled with the radio to transmit. Example 52 is the method of Example 50, the first adjusted leader clock value comprising a sum of the local clock at the leader and the relative offset of the local clock at the leader from the local clock of the follower and the second adjusted clock value comprising a sum of the local clock at the follower and the relative offset of the local clock at the follower from the local clock of the leader. Example 53 is the method of Example 52, the logic circuitry to further receiving a first initial fine timing management frame, causing transmission of a second initial fine timing frame in response to receipt of the first fine timing management frame, causing transmission of an acknowledgement in response to receipt of the first fine timing management frame, and receiving an acknowledgement in response to the transmission of a second initial fine timing frame. Example 54 is the method of Example 53, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 55 is the method of Example 53, wherein the first set of two or more timing management frames and the second of two or more timing management frames comprise fine timing management frames. Example 56 is the method of Example 55, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 57 is the method of Example 50, wherein calculation of the difference comprises calculation in response to receipt of each acknowledgement in the second set of acknowledgement frames. Example 58 is the method of Example 50, wherein the time frame between receipt of a time management frame in the first set of time management frames and transmission of a time management frame in the second set of time management frames is a minimum of a short interframe space.

Example 59 is an apparatus comprising: a means for causing transmission of a first set of two or more timing management frames wherein one or more of the two or more timing management frames in the first set comprise a first adjusted leader clock value; a means for receiving a second set of two or more timing management frames, wherein one or more of the two or more timing management frames in the second set comprise a second adjusted clock value; a means for receiving a first set of two or more acknowledgement frames; a means for calculating the second adjusted clock value; a means for causing transmission of a second set of two or more acknowledgement frames; and a means for calculating a difference between the first adjusted leader clock value and the second adjusted clock value to determine a synchronization error, the synchronization error to represent a performance of the time synchronization. Example 60 is the apparatus of Example 59, wherein the logic circuitry comprises baseband processing circuitry and further comprising a radio coupled with the baseband processing circuitry, and one or more antennas coupled with the radio to transmit. Example 61 is the apparatus of Example 59, the first adjusted leader clock value comprising a sum of the local clock at the leader and the relative offset of the local clock at the leader from the local clock of the follower and the second adjusted clock value comprising a sum of the local clock at the follower and the relative offset of the local clock at the follower from the local clock of the leader. Example 62 is the apparatus of Example 61, further comprising a means for receiving a first initial fine timing management frame, a means for causing transmission of a second initial fine timing frame in response to receipt of the first fine timing management frame, a means for causing transmission of an acknowledgement in response to receipt of the first fine timing management frame, and a means for receiving an acknowledgement in response to the transmission of a second initial fine timing frame. Example 63 is the apparatus of Example 62, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames. Example 64 is the apparatus of Example 62, wherein the first set of two or more timing management frames and the second of two or more timing management frames comprise fine timing management frames. Example 65 is the apparatus of Example 64, wherein one or more fine timing management frames of the first set of two or more timing management frames and the second of two or more timing management frames comprise a time synchronization performance information element, the time synchronization performance information element to comprise a Time Synchronization Error Threshold field with a value indicative of an upper limit of synchronization error between a time at the Leader and a time at the Follower. Example 66 is the apparatus of Example 59, wherein calculation of the difference comprises calculation in response to receipt of each acknowledgement in the second set of acknowledgement frames. Example 67 is the apparatus of Example 59, wherein the time frame between receipt of a time management frame in the first set of time management frames and transmission of a time management frame in the second set of time management frames is a minimum of a short interframe space.

What is claimed is:

1. An apparatus comprising:
   a memory; and
   baseband circuitry of a leader device coupled with the memory to perform a synchronization protocol for a wireless link of a time-sensitive network between the leader device and a follower device to quantify a performance of time synchronization of the wireless link for time-sensitive applications with critical performance requirements, the baseband circuitry to:
   receive, from the follower device, a first set of two or more timing management frames wherein one or more of the two or more timing management frames in the first set comprise a first adjusted follower clock value;
   calculate a second adjusted clock value based on arrival times associated with a second set of two or more timing management frames;
   cause, via radio circuitry, transmission of the second set of two or more timing management frames to the follower device, wherein one or more of the two or more timing management frames in the second set comprise the second adjusted clock value;
   cause, via the radio circuitry, transmission of a first set of two or more acknowledgement frames, to the follower device, comprising arrival times associated with the first set of the two or more timing management frames and departure times associated with the first set of the two or more acknowledgement frames;
   receive, from the follower device, a second set of two or more acknowledgement frames comprising the arrival times associated with the second set of the two or more management frames and departure times associated with the second set of the two or more acknowledgement frames; and
   calculate a difference between the first adjusted follower clock value and the second adjusted clock value to determine a synchronization error, the synchronization error to represent a performance of the time synchronization for the wireless link.

2. The apparatus of claim 1, wherein the baseband circuitry comprises baseband processor and further comprising the radio circuitry coupled with the baseband processor, and one or more antennas coupled with the radio circuitry to transmit.

3. The apparatus of claim 1, the first adjusted follower clock value comprising a sum of a local clock at the follower device and a relative offset of the local clock at the follower device from a local clock of the leader device and the second adjusted clock value comprising a sum of the local clock at the leader device and a relative offset of the local clock at the leader device from the local clock of the follower device.

4. The apparatus of claim 1, the baseband circuitry to further receive a first fine timing management frame, cause transmission of a second fine timing frame in response to receipt of the first fine timing management frame, cause transmission of an acknowledgement in response to receipt of the first fine timing management frame, and receive an acknowledgement in response to the transmission of the second fine timing frame.

5. The apparatus of claim 4, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames.

6. The apparatus of claim 4, wherein the first set of the two or more timing management frames and the second of the two or more timing management frames comprise fine timing management frames.

7. The apparatus of claim 6, wherein one or more fine timing management frames of the first set of the two or more timing management frames and the second set of the two or more timing management frames comprise a time synchronization performance information element, the time synchronization performance information element to comprise a Time Synchronization Error Threshold field with a value indicative of an upper limit of synchronization error between a time at the leader device and a time at the follower device.

8. The apparatus of claim 1, wherein calculation of the difference comprises calculation in response to receipt of each acknowledgement in the second set of the two or more acknowledgement frames.

9. The apparatus of claim 8, wherein a time frame between receipt of a time management frame in the first set of the two or more time management frames and transmission of a time management frame in the second set of time management frames is a minimum of a short interframe space.

10. A non-transitory computer-readable medium, comprising instructions to perform a synchronization protocol for one or more wireless links of a time-sensitive network between a leader device and at least one follower device to quantify a performance of time synchronization of the one or more wireless links for time-sensitive applications with critical performance requirements, which when executed by a processor, cause the processor to perform operations to:
receive, from the at least one follower device, a first set of two or more timing management frames wherein one or more of the two or more timing management frames in the first set comprise at least one first adjusted follower clock value;
calculate at least one second adjusted clock value based on arrival times associated with a second set of two or more timing management frames;
cause, via a radio, transmission of the second set of the two or more timing management frames to the at least one follower device, wherein one or more of the two or more timing management frames in the second set comprise the second adjusted clock value, to the at least one follower device, comprising arrival times associated with the first set of the two or more timing management frames and departure times associated with a first set of two or more acknowledgement frames;
cause, via the radio, transmission of the first set of the two or more acknowledgement frames, to the at least one follower device, comprising arrival times associated with the first set of the two or more timing management frames and the departure times associated with the first set of the two or more acknowledgement frames;
receive, from the at least one follower device, a second set of two or more acknowledgement frames comprising arrival times associated with the second set of two or more management frames and departure times associated with the second set of the two or more acknowledgement frames; and
calculate a difference between the at least one first adjusted follower clock value and the at least one second adjusted clock value to determine at least one synchronization error, the at least one synchronization error to represent a performance of the time synchronization for the one or more wireless links.

11. The non-transitory computer-readable medium of claim 10, the first adjusted follower clock value comprising a sum of a local clock at the follower device and a relative offset of the local clock at the follower from a local clock of the leader device and the second adjusted clock value comprising a sum of the local clock at the leader device and a relative offset of the local clock at the leader device from the local clock of the follower device.

12. The non-transitory computer-readable medium of claim 10, the operations to further receive a first fine timing management frame, cause transmission of a second fine timing frame in response to receipt of the first fine timing management frame, cause transmission of an acknowledgement in response to receipt of the first fine timing management frame, and receive an acknowledgement in response to the transmission of the second fine timing frame.

13. The non-transitory computer-readable medium of claim 12, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames.

14. An apparatus comprising:
a memory; and
baseband circuitry of a follower device coupled with the memory to perform a synchronization protocol for a wireless link of a time-sensitive network between a leader device and the follower device to quantify a performance of time synchronization of the wireless link for time-sensitive applications with critical performance requirements, the baseband circuitry to:
receive, from the leader device, a first set of two or more timing management frames wherein one or more of the two or more timing management frames in the first set comprise a first adjusted leader clock value;
calculate a second adjusted clock value based on arrival times associated with a second set of two or more timing management frames;
cause, via radio circuitry, transmission of the second set of the two or more timing management frames, wherein one or more of the two or more timing management frames in the second set comprise the second adjusted clock value;
cause, via the radio circuitry, transmission of a first set of two or more acknowledgement frames, to the leader device, comprising arrival times associated with the first set of the two or more timing management frames and departure times associated with the first set of the two or more acknowledgement frames;
receive, from the leader device, a second set of two or more acknowledgement frames comprising the arrival times associated with the second set of the two or more management frames and departure times associated with the second set of the two or more acknowledgement frames; and
calculate a difference between the first adjusted leader clock value and the second adjusted clock value to determine a synchronization error, the synchronization error to represent a performance of the time synchronization for the wireless link.

15. The apparatus of claim 14, wherein the baseband circuitry comprises baseband processor and further comprising the radio circuitry coupled with the baseband processor, and one or more antennas coupled with the radio circuitry to transmit.

16. The apparatus of claim 14, the first adjusted leader clock value comprising a sum of a local clock at the leader device and a relative offset of the local clock at the leader device from a local clock of the follower device and the second adjusted clock value comprising a sum of the local clock at the follower device and a relative offset of the local clock at the follower device from the local clock of the leader device.

17. The apparatus of claim 16, the baseband circuitry to further receive a first fine timing management frame, cause transmission of a second fine timing frame in response to receipt of the first fine timing management frame, cause transmission of an acknowledgement in response to receipt of the first fine timing management frame, and receive an acknowledgement in response to the transmission of the second fine timing frame.

18. The apparatus of claim 17, wherein the first fine timing management frame comprises parameters including a number of time management frames in the first and second sets of time management frames, a time interval between transmission of time management frames in the first and second sets of time management frames, and a bandwidth of a channel used for transmission of the first and second sets of time management frames.

19. The apparatus of claim 17, wherein the first set of the two or more timing management frames and the second of the two or more timing management frames comprise fine timing management frames.

20. The apparatus of claim 19, wherein one or more fine timing management frames of the first set of the two or more timing management frames and the second of the two or more timing management frames comprise a time synchronization performance information element, the time synchronization performance information element to comprise a Time Synchronization Error Threshold field with a value indicative of an upper limit of synchronization error between a time at the leader device and a time at the follower device.

21. The apparatus of claim 14, wherein calculation of the difference comprises calculation in response to receipt of each acknowledgement in the second set of the two or more acknowledgement frames.

22. The apparatus of claim 14, wherein a time frame between receipt of a time management frame in the first set of the two or more time management frames and transmission of a time management frame in the second set of the two or more time management frames is a minimum of a short interframe space.

23. A non-transitory computer-readable medium, comprising instructions to perform a synchronization protocol for a wireless link of a time-sensitive network between a leader device and a follower device to quantify a performance of time synchronization of the wireless link for time-sensitive applications with critical performance requirements, which when executed by a processor, cause the processor to perform operations to:
  receive, from the leader device, a first set of two or more timing management frames wherein one or more of the two or more timing management frames in the first set comprise a first adjusted leader clock value;
  calculate a second adjusted clock value based on arrival times associated with a second set of two or more timing management frames;
  cause, via a radio, transmission of the second set of the two or more timing management frames to the leader device, wherein one or more of the two or more timing management frames in the second set comprise the second adjusted clock value;
  cause, via the radio, transmission of a first set of the two or more acknowledgement frames, to the leader device, comprising arrival times associated with the first set of the two or more timing management frames and departure times associated with the first set of the two or more acknowledgement frames;
  receive, from the leader device, a second set of two or more acknowledgement frames comprising the arrival times associated with the second set of the two or more management frames and departure times associated with the second set of the two or more acknowledgement frames; and
  calculate a difference between the first adjusted leader clock value and the second adjusted clock value to determine a synchronization error, the synchronization error to represent a performance of the time synchronization for the wireless link.

24. The non-transitory computer-readable medium of claim 23, the first adjusted leader clock value comprising a sum of a local clock at the leader device and a relative offset of the local clock at the leader device from a local clock of the follower device and the second adjusted clock value comprising a sum of the local clock at the follower device and a relative offset of the local clock at the follower device from the local clock of the leader device.

25. The non-transitory computer-readable medium of claim 24, the operations to further receive a first fine timing management frame, cause transmission of a second fine timing frame in response to receipt of the first fine timing management frame, cause transmission of an acknowledgement in response to receipt of the first fine timing management frame, and receive an acknowledgement in response to the transmission of the second fine timing frame.

* * * * *